(12) United States Patent
Tezuka et al.

(10) Patent No.: US 10,434,411 B2
(45) Date of Patent: Oct. 8, 2019

(54) GAME PROGRAM FOR SELECTIVELY EXECUTING AUTOMATIC, MANUAL, AND SPECIAL MANUAL ACTIONS, AND ASSOCIATED COMPUTER-READABLE STORAGE MEDIA, SYSTEMS, METHODS, AND/OR APPARATUSES

(71) Applicant: NINTENDO CO., LTD., Kyoto-shi, Kyoto (JP)

(72) Inventors: Takashi Tezuka, Kyoto (JP); Masanobu Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 124 days.

(21) Appl. No.: 15/668,821

(22) Filed: Aug. 4, 2017

(65) Prior Publication Data

US 2018/0056183 A1 Mar. 1, 2018

Related U.S. Application Data

(63) Continuation of application No. PCT/JP2016/003985, filed on Aug. 31, 2016.

(51) Int. Cl.
*A63F 13/00* (2014.01)
*A63F 13/42* (2014.01)
(Continued)

(52) U.S. Cl.
CPC .......... *A63F 13/42* (2014.09); *A63F 13/2145* (2014.09); *A63F 13/25* (2014.09);
(Continued)

(58) Field of Classification Search
CPC .......... A63F 13/2145; A63F 2300/1075; A63F 13/10; A63F 13/426; A63F 2300/6045;
(Continued)

(56) References Cited

U.S. PATENT DOCUMENTS

2006/0094502 A1* 5/2006 Katayama ............... A63F 13/10
463/31
2006/0217196 A1 9/2006 Kikkawa et al.
(Continued)

FOREIGN PATENT DOCUMENTS

JP 2005-318943 11/2005
JP 2006-247254 9/2006
(Continued)

OTHER PUBLICATIONS

Temple Run game, released 2011, see https://en.wikipedia.org/wiki/Temple_Run and https://www.wikihow.com/Play-Temple-Run (Year: 2011).*

(Continued)

*Primary Examiner* — Justin L Myhr
(74) *Attorney, Agent, or Firm* — Nixon & Vanderhye PC

(57) ABSTRACT

In an action game in which a screen is scrolled in a predetermined direction, a player character is moved in the predetermined direction on a game screen even when a movement command input is not performed from a player. In response to a touch input being detected in a state in which a first predetermined condition is satisfied, the player character is caused to execute a first action and a first point is added.

30 Claims, 27 Drawing Sheets

(51) Int. Cl.
  *A63F 13/47* (2014.01)
  *A63F 13/44* (2014.01)
  *A63F 13/577* (2014.01)
  *A63F 13/2145* (2014.01)
  *A63F 13/25* (2014.01)
  *A63F 13/525* (2014.01)
  *A63F 13/56* (2014.01)

(52) U.S. Cl.
  CPC .............. *A63F 13/44* (2014.09); *A63F 13/47* (2014.09); *A63F 13/525* (2014.09); *A63F 13/56* (2014.09); *A63F 13/577* (2014.09); *A63F 2300/1075* (2013.01)

(58) Field of Classification Search
  CPC .... A63F 2300/204; A63F 13/92; A63F 13/55; A63F 13/56; A63F 13/42; A63F 13/573; A63F 13/577; A63F 2300/6623; A63F 2300/8094; A63F 13/00; A63F 13/005; A63F 13/20; A63F 13/21; A63F 13/428; A63F 13/44; A63F 13/47; A63F 2300/638; A63F 13/40; A63F 13/50; A63F 13/52; G06F 3/011
  See application file for complete search history.

(56) References Cited

U.S. PATENT DOCUMENTS

2006/0258455 A1\* 11/2006 Kando .................... A63F 13/10 463/36
2011/0111851 A1 5/2011 Hayashida et al.
2011/0306414 A1 12/2011 McNeely et al.
2012/0302339 A1 11/2012 Kimura et al.
2013/0324249 A1 12/2013 Kimura et al.
2013/0331185 A1 12/2013 Kimura et al.
2014/0028544 A1\* 1/2014 Amano .................... G09G 5/00 345/156

FOREIGN PATENT DOCUMENTS

JP 2011-101754 5/2011
JP 2012-239794 12/2012
JP 2016-013268 1/2016

OTHER PUBLICATIONS

Inoue, Masaki, 'Mario? Street Fighter2? Spelunker? A running game with a lawless area of familiar 8bit characters, "Super pico pico runners"!', [online],, May 21, 2014, Mfro Inc., appligakuen, [searched on Nov. 7, 2016], Internet <URL:http://www.appgaku.com/iphone-app (10 pages).

"Tried playing "Super pico pico runners"", [online], May 15, 2014, Yuruapp!, [searched on Nov. 7, 2016,. Internet <URL:http://www.android.yuruapp.com/?p=1887%uFEFF (5 pages).

International Search Report for PCT/JP2016/003985, dated Nov. 22, 2016, 6 pages.

Written Opinion of the ISA for PCT/JP2016/003985, dated Nov. 22, 2016, 10 pages.

\* cited by examiner

F I G. 1
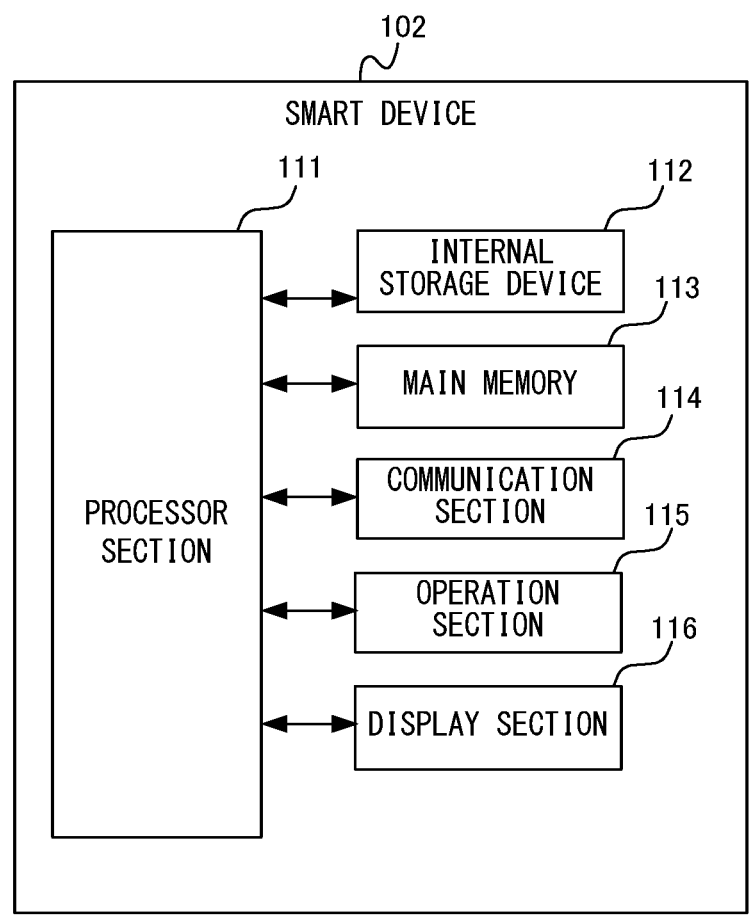

F I G. 1 1
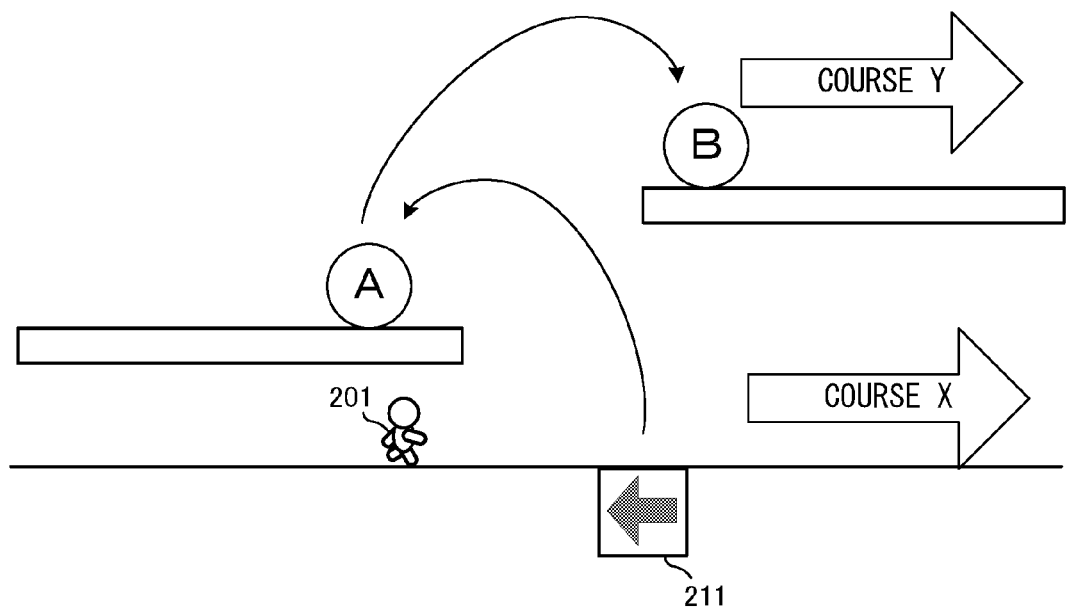

F I G. 3 3
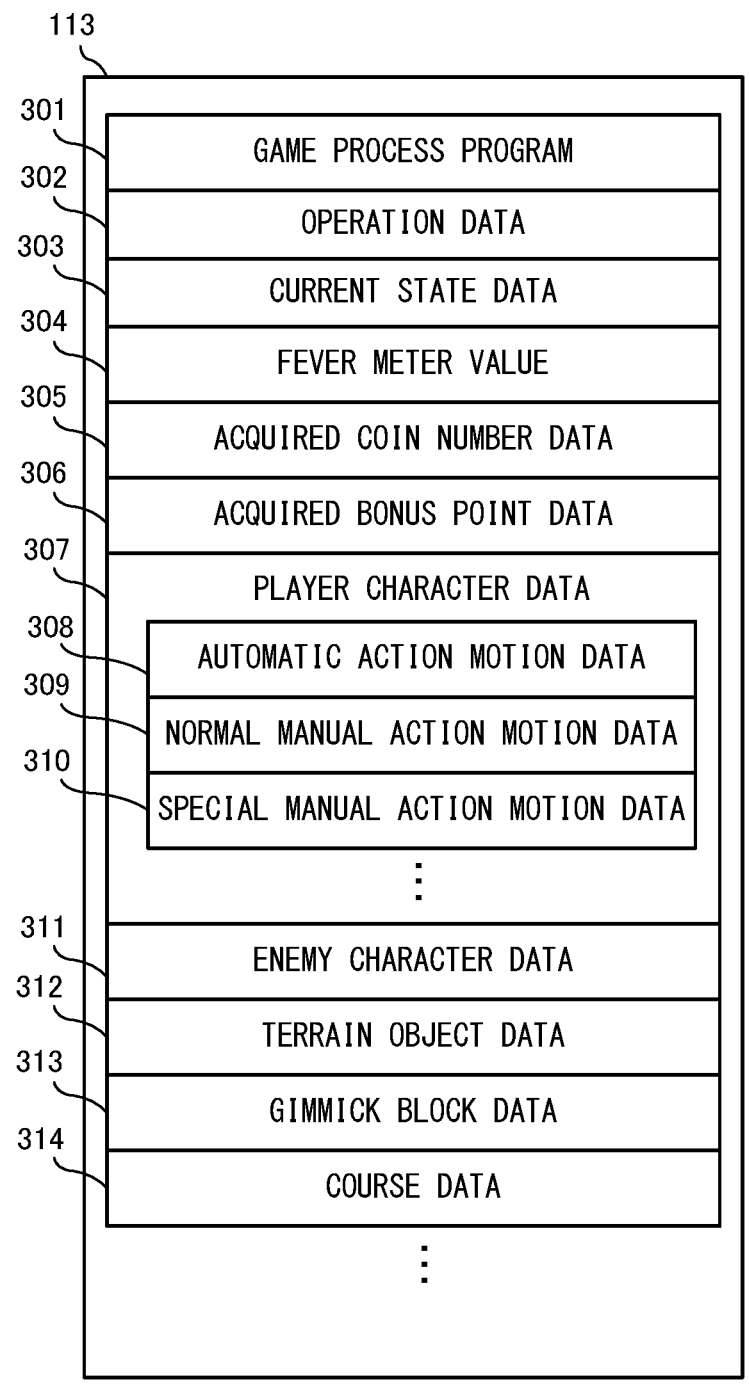

GAME PROGRAM FOR SELECTIVELY EXECUTING AUTOMATIC, MANUAL, AND SPECIAL MANUAL ACTIONS, AND ASSOCIATED COMPUTER-READABLE STORAGE MEDIA, SYSTEMS, METHODS, AND/OR APPARATUSES

CROSS REFERENCE TO RELATED APPLICATION

This is a continuation application of PCT/JP2016/003985 filed on Aug. 31, 2016, the content of which is incorporated herein by reference.

FIELD

The exemplary embodiments relate to a computer-readable non-transitory storage medium having stored therein a game program, and more specifically, a computer-readable non-transitory storage medium having stored therein a game program that causes a computer of an information processing apparatus including a touch input section, to execute an action game in which a screen is scrolled in a predetermined direction.

BACKGROUND AND SUMMARY

Conventionally, scrolling action games are known (for example, Japanese Laid-Open Patent Publication No. 2011-101754). In such a game, it is general that a player character is moved in a virtual game space in accordance with an operation input from a player.

In the game as described above, the objective is to reach a goal while defeating enemy characters and collecting items, and meanwhile, a player's operation tends to be complicated. In the above game, the screen is scrolled in accordance with movement (i.e., player's operation) of a player character. On the other hand, there is also known an action game in which a screen is automatically scrolled without a player's operation. However, in such a game, movement of the player character has no unexpectedness and thus the game is likely to develop monotonously.

Therefore, an object of the exemplary embodiments is to provide a game program and the like that can increase variations of play content with simple operability.

Configuration examples for achieving the above object will be shown below.

One configuration example is a computer-readable non-transitory storage medium having stored therein a game program that causes a computer of an information processing apparatus having a touch input section to execute an action game in which a screen is scrolled in a predetermined direction, the game program causing the computer to execute operation reception, player character movement, first determination, first action execution, and first addition. In the operation reception, a touch input to the touch input section is received from a player. In the player character movement, a player character is moved in a predetermined direction on a game screen even when a movement command input is not performed from the player. In the first determination, whether the touch input is detected in a state in which a first predetermined condition is satisfied, is determined. In the first action execution, the player character is caused to execute a first action in response to determination being made in the first determination that the touch input is detected in a state in which the first predetermined condition is satisfied. In the first addition, a first point is added in response to determination being made in the first determination that the touch input is detected in a state in which the first predetermined condition is satisfied.

According to the above configuration example, it becomes possible to provide a game having increased variations of play content while ensuring simple operability. That is, in general, in the case of using a simple operation, the play content is often monotonous, but in the above configuration example, it is possible to provide variations in play content and enhance amusement of the game. In addition, since the first point is given for the fact that the first action is performed, the player's act (operation, play content) that the first action has been performed can be evaluated, whereby a new motivation can be given to the player.

In other configuration examples, in the first determination, the touch input may be determined to be detected in a state in which the first predetermined condition is satisfied, if the touch input is detected while the player character is executing an action different from the first action. The game program may further cause the computer to execute: second determination of determining whether a second predetermined condition is satisfied when the movement command input is not being performed from the player; and second action execution of causing the player character to execute a second action in response to determination being made in the second determination that the second predetermined condition is satisfied; and second addition of adding a second point in response to the same determination. In the second addition, a point different from the first point added in the first addition may be added. In the second determination, the second predetermined condition may be determined to be satisfied, when the player character and an obstacle object serving to hinder movement of the player character have a predetermined positional relationship. For example, the second predetermined condition may be determined to be satisfied, when the player character comes into contact with the obstacle object. In the second determination, the second predetermined condition may be determined to be satisfied, if a positional relationship between the player character and the obstacle object when the player character comes into contact with the obstacle object is a predetermined positional relationship. The obstacle object may include a first-type obstacle object and a second-type obstacle object, and in the second determination, the second predetermined condition may be determined to be satisfied, when the player character has a predetermined positional relationship with the first-type obstacle object, and the second predetermined condition may be determined to be not satisfied, when the player character has a predetermined positional relationship with the second-type obstacle object. In the second action execution, an action in which the player character avoids the obstacle object may be executed as the second action.

According to the above configuration examples, for example, it is possible to cause the player character to (automatically) perform an action without the player particularly performing any operation. Therefore, it is possible to provide the player with room for choice of plural options of: causing the player character to perform an action in response to a touch operation by the player; and causing the player character to perform an action intentionally without performing any operation. For example, it is possible to provide room for choice to collide with an enemy object intentionally "without performing any operation", in order to cause the player character to perform an automatic action. Thus, it is possible to provide variations in play content while using a simple operation. Further, by providing obstacle objects for which automatic actions are to be performed and obstacle objects other than such obstacle objects, it is possible to further increase the variations and further enhance amusement of the game.

In another configuration example, the game program may further cause the computer to execute: third determination of determining whether a result of a process executed in the first action execution satisfies a predetermined condition; and third addition of adding a third point in response to determination being made in the third determination that the result of the process executed in the first action execution satisfies the predetermined condition. It is noted that the third point may be the same as the first point or may be different from the first point.

According to the above configuration example, points can be given also for a result of a certain action, e.g., a case where a plurality of enemy objects are beaten successively or a case where a plurality of coins placed in a specific arrangement are all acquired by one action. Thus, the player's motivation can be enhanced, and also amusement of the game can be enhanced.

In other configuration examples, in the first determination, the touch input may be determined to be detected in a state in which the first predetermined condition is satisfied, if the touch input is detected while the player character is executing an action different from the first action. Alternatively, in the first determination, the touch input may be determined to be detected in a state in which the first predetermined condition is satisfied, if the touch input is detected when the player character and another object have a predetermined positional relationship. In the first determination, the touch input may be determined to be detected in a state in which the first predetermined condition is satisfied, if the touch input is detected while the player character is executing the second action.

According to the above configuration examples, for example, a condition focusing on the player character itself performing a predetermined action, and a condition focusing on a relationship with another object, such as a positional relationship (e.g., whether the player character is in contact with a wall) between the player character and another object, are used. Therefore, it is possible to increase variations in play content while ensuring simple operability.

In another configuration example, the touch input section may be a touch panel integrated with a screen, and in the operation reception, the touch input to any position within a display area excluding some area on the screen, may be received.

According to the above configuration example, it is possible to provide more intuitive operability.

In another configuration example, scroll control of the game screen may be performed so that the display area displaying a virtual game space imaged by a virtual camera is scrolled in one predetermined direction so as to follow movement of the player character.

According to the above configuration example, it is possible to provide a game screen that allows the player to easily grasp the play situation.

In another configuration example, the first action execution may include third action execution of causing the player character to execute a third action different from the first action in response to the touch input being detected in a state in which the first predetermined condition is not satisfied, and the first point may not be added for execution of the third action in the third action execution.

According to the above configuration example, for example, the player character can be caused to perform such an action as to simply jump as the third action. Thus, it is possible to provide variations in play content while ensuring simple operability.

In other configuration examples, in the first determination, the touch input may be determined to be detected in a state in which the first predetermined condition is satisfied, in response to a touch-on being detected in the operation reception in a state in which the first predetermined condition is satisfied. The first predetermined condition may include a plurality of conditions, and in the first determination, the touch input may be determined to be detected in a state in which the first predetermined condition is satisfied, in response to a touch-on being detected in the operation reception in a state in which any of the plurality of conditions is satisfied. A plurality of actions different from each other may be defined as the first action, and in the first action execution, one of the plurality of actions that corresponds to each of the plurality of conditions may be executed as the first action. In this case, in the first addition, the first point may be added by an amount that differs depending on each first action executed in response to determination being made in the first determination that the first predetermined condition is satisfied.

According to the above configuration example, it is possible to provide the player with an excellent response to an operation. In addition, for example, while a plurality of actions are defined as the first action, the amount of points to be acquired can be made different depending on the content of the executed first action, whereby amusement of the game can be enhanced.

In other configuration examples, the game program may further cause the computer to execute third addition of adding a third point different from the first point. In the third addition, the third point may be added in response to the player character coming into contact with an item object placed in a virtual game space.

According to the above configuration example, variations in play objective, e.g., collecting coins or gaining scores, are provided, whereby amusement of the game can be enhanced.

According to the exemplary embodiments, in a forced scrolling action game, it is possible to provide the game with variations in play content while providing simple operability.

BRIEF DESCRIPTION OF THE DRAWINGS

FIG. 1 is a function block diagram showing a non-limiting example of a portable smart device 102;

FIG. 11 is a diagram illustrating a non-limiting example of the reverse arrow block;

FIG. 33 is a diagram illustrating a non-limiting example of a program and information stored in a smart device 102 and a main memory 113;

DETAILED DESCRIPTION OF NON-LIMITING EXAMPLE EMBODIMENTS

Figure 2:
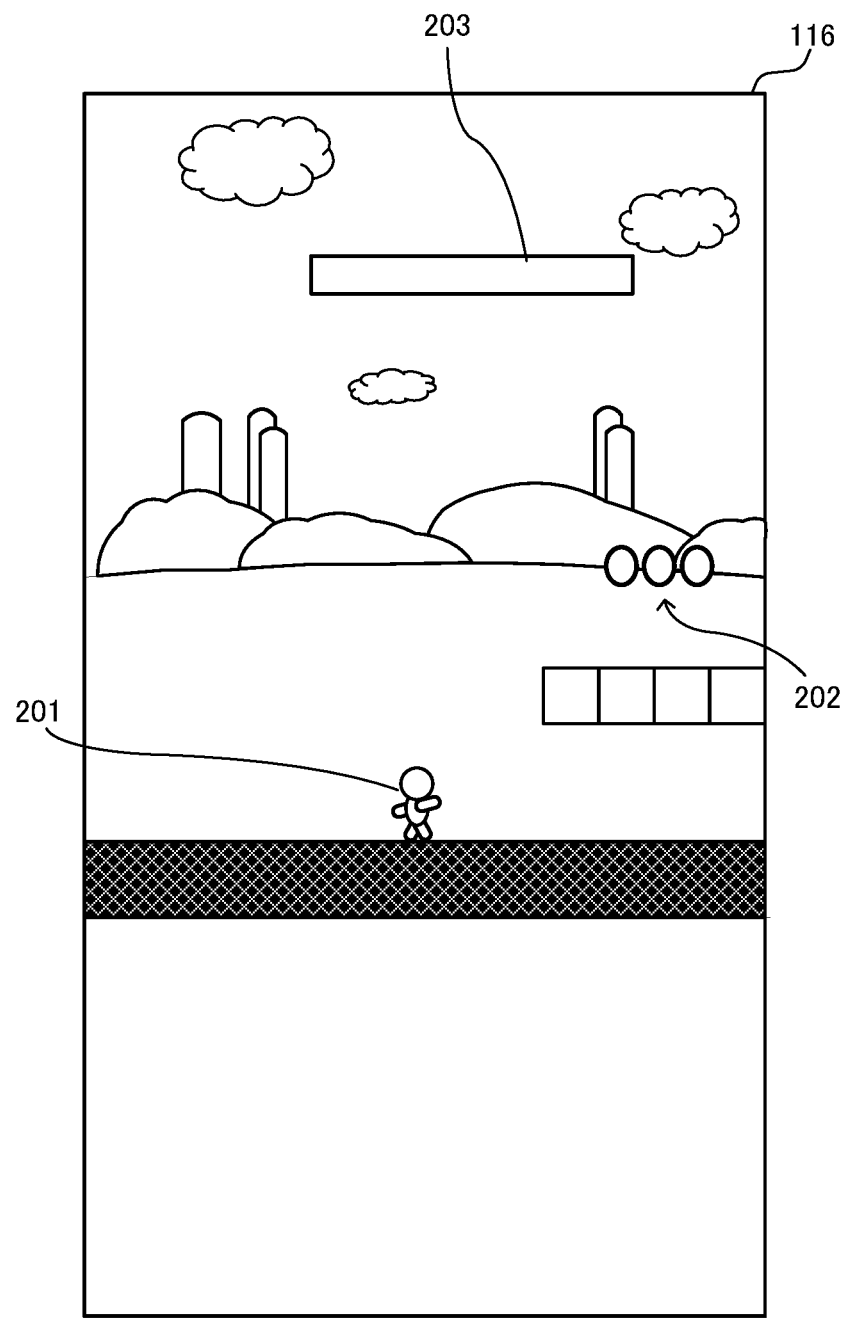
FIG. 2 shows a non-limiting example of a game screen according to an exemplary embodiment.

Hereinafter, an exemplary embodiment of will be described.

FIG. 1 is a function block diagram of a portable smart device 102 (hereinafter, simply referred to as a smart device) which is an example of an information processing apparatus according the exemplary embodiment. In FIG. 1, the smart device 102 includes a processor section 111, an internal storage device 112, a main memory 113, a communication section 114, an operation section 115, and a display section 116. The processor section 111 controls operation of the smart device 102 by executing an information process described later and executing a system program (not shown) for controlling the overall operation of the smart device 102. It is noted that the processor section 111 may include a single processor or include a plurality of processors. The internal storage device 112 stores various programs to be executed by the processor section 111 and various data to be used in the programs. The internal storage device 112 is, for example, a flash EEPROM or a hard disk device. The main memory 113 temporarily stores a computer program and information. The communication section 114 is capable of establishing connection with a network via wired or wireless communication, and transmitting and receiving predetermined data to and from a predetermined server or another smart device. The operation section 115 is, for example, an input device for receiving an operation from a user. A typical example of the display section 116 is a liquid crystal display device. It is noted that, in a process according to the exemplary embodiment, the operation section 115 and the display section 116 are assumed to be a touch panel integrated with a liquid crystal screen. In another exemplary embodiment, as the operation section 115, a predetermined pointing device other than a touch panel may be used.

In the exemplary embodiment, an example in which the game process described later is executed by the smart device 102 will be described. However, without limitation thereto, the process according to the exemplary embodiment below is applicable also to a hand-held game apparatus or the like as an information processing apparatus.

Next, the outline of operation in the information process according to the exemplary embodiment will be described. In the process according to the exemplary embodiment, a side-scrolling jump action game is assumed. More specifically, a game assumed in the exemplary embodiment is a jump action game in which a screen is automatically scrolled in the horizontal direction. That is, irrespective of a player's operation (even when a movement command input is not performed by the player), a player character automatically moves, whereby the screen is automatically scrolled. FIG. 2 shows an example of a game screen according to the exemplary embodiment. In FIG. 2, a player character 201, a coin object 202, and a fever meter 203 are shown. In this game, in principle, the player character 201 automatically moves in the rightward direction on the screen. In conjunction with the movement of the player character, the screen is also automatically scrolled horizontally (in other words, the screen is forcibly scrolled horizontally). In this case, on the screen (display area), the position on the screen horizontal-direction axis (horizontal axis) at which the player character 201 is displayed is not changed in principle, but is maintained at a predetermined position. In the exemplary embodiment, the display position on the horizontal axis is the center of the screen.

The scrolling control will be described more specifically. First, a virtual camera is set in a virtual game space such that the player character 201 is located in front of the virtual camera. Then, the virtual camera moves in conjunction with movement of the player character 201 so as to maintain the present positional relationship. In other words, control is performed such that the display area is scrolled in the screen horizontal direction so as to follow movement of the player character 201. In this follow-up control, the display area may be controlled to exactly follow movement of the player character 201 without time lag, or may be controlled to follow movement of the player character 201 slightly later than the movement.

The display position of the player character 201 is not limited to the above position. In another exemplary embodiment, the player character 201 may be displayed in a fixed manner slightly leftward from the screen center on the horizontal axis so that the area on the advancing-direction side is viewed spaciously. In the exemplary embodiment, the game in which the screen is forcibly scrolled horizontally is described as an example, but the scrolling direction is not limited to the horizontal direction. In another exemplary embodiment, the scrolling direction may be the vertical direction or an oblique direction.

The basic objective in this game is to reach a goal point (within time limit) while collecting coin objects 202 placed in a game course. In this game, the number of the collected coin objects 202 is not indicated on the screen during game course progression. In this game, after the game course is cleared, a result screen (not shown) is displayed, and on this screen, the number (this also serves as the score) of the acquired coin objects 202 is indicated.

The basic way to play this game will be described. As described above, the player character automatically advances in the rightward direction. When a predetermined condition is satisfied, the player character 201 automatically performs a predetermined "action" without the player particularly performing any operation. In the following description, such an action that is automatically performed is referred to as an "automatic action". Specifically, one of the automatic actions is "leapfrog" which is an action of automatically leaping over a height corresponding to one unit of the player character 201. For example, it is assumed that an enemy character having a height corresponding to one unit of the player character 201 is present in the advancing direction of the player character 201. In such a case, when nearly coming into contact with the enemy character (coming close thereto to a certain extent), the player character 201 automatically performs an action of leapfrogging over the enemy character, thus leaping over the enemy character (automatic avoidance). Another one of the automatic actions is "clamber" which is an action of clambering a wall higher than the player character 201. When the player character 201 comes into contact with an upper end part, of such a wall, that corresponds to one unit, the player character 201 performs an action of automatically clambering the wall and then rolling forward after finishing the clambering. Still another example of the automatic action is "break-fall". This is an action of automatically rolling to make break-fall when the player character 201 jumps down from a height corresponding to two units or more of the player characters 201 and lands on the ground. Owing to such automatic actions, it is possible to cause the player character 201 to advance in the game course to reach the goal point without the player particularly performing any operation.

Regarding the automatic action of leapfrog, enemy characters are classified into several types, so that not all the enemy characters are automatically avoided by leapfrog as described above. Predetermined specific types of enemy characters are targets of the automatic action. Therefore, when an enemy character that is not a target of the automatic action is present in the advancing direction, the player character 201 will come into contact with the enemy character as long as the player leaves the player character 201 without performing any operation. As a result, a process disadvantageous to the player, such as addition of a predetermined damage value to the player character 201, is performed. Therefore, in such a case, the player needs to, for example, avoid such an enemy character by performing a normal manual action described later.

Next, the case of causing the player character to perform a predetermined action on the basis of a player's operation will be described. As an action of a type different from the automatic action as described above, the player can cause the player character to perform a predetermined action by tapping the screen. Hereinafter, such an action is referred to as a "manual action" in contrast of the automatic action. In the exemplary embodiment, the manual action is classified into two types of "normal manual action" and "special manual action".

First, the normal manual action will be described. Specifically, this action is an action in which the player character 201 "jumps" in response to a tap operation performed by the player when the player character 201 is in contact with the ground (as it were, normal jump). In this tap operation, any position on the screen may be tapped in principle. However, if a menu button or the like is provided on the screen, such a location may be excluded. Alternatively, only a tap operation on the display area on which the virtual game space is displayed may be accepted. The height of jumping slightly varies in accordance with a touch continuation period (period from touch-on to touch-off) of the tap operation.

Next, the special manual action will be described. This is an action performed by the player performing a tap operation under a predetermined condition. Examples of special manual actions will be shown below. For example, an action of jumping in response to a tap operation being performed during the leapfrog is a special manual action. In addition, a jump performed by a tap operation during the final forward rolling (at a timing when the forward-rolling motion is being displayed) in the clambering automatic action, is also a special manual action. In addition, a jump performed by a tap operation during a motion of forward rolling to make break-fall in the break-fall automatic action, is also treated as a special manual action. Besides, a jump on a gimmick block (reverse arrow block or the like) described later is also treated as a special manual action. In addition, a "wall-kick jump" exemplified below is also a special manual action. It is noted that, as a matter of course, the automatic actions and the special manual actions are not limited to the above actions but may be other actions.

Figure 3:
FIG. 3 is a diagram illustrating a non-limiting example of an automatic action.
Figure 4:
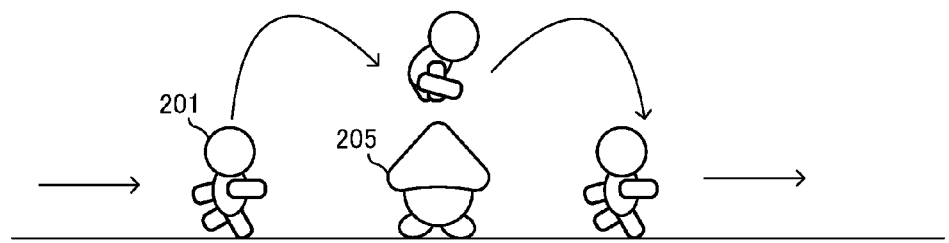
FIG. 4 is a diagram illustrating a non-limiting example of an automatic action.

Here, some of the automatic actions and the special manual actions will be exemplified with reference to the drawings. First, the leapfrog automatic action and the special manual action during the leapfrog will be exemplified. As described above, the player character 201 moves automatically. Here, as shown in FIG. 3, a situation in which an enemy character 205 is present in the advancing direction of the player character 201 (a situation in which the enemy character 205 is approaching from the advancing direction) is assumed. In this case, if the player does not perform any operation, when the player character 201 approaches to be almost in contact with the enemy character 205, the player character 201 performs an automatic action of automatically "leapfrogging" the enemy character to avoid contact therewith (automatic avoidance), as shown in FIG. 4 (in this case, the enemy character 205 is not damaged).

Figure 5:
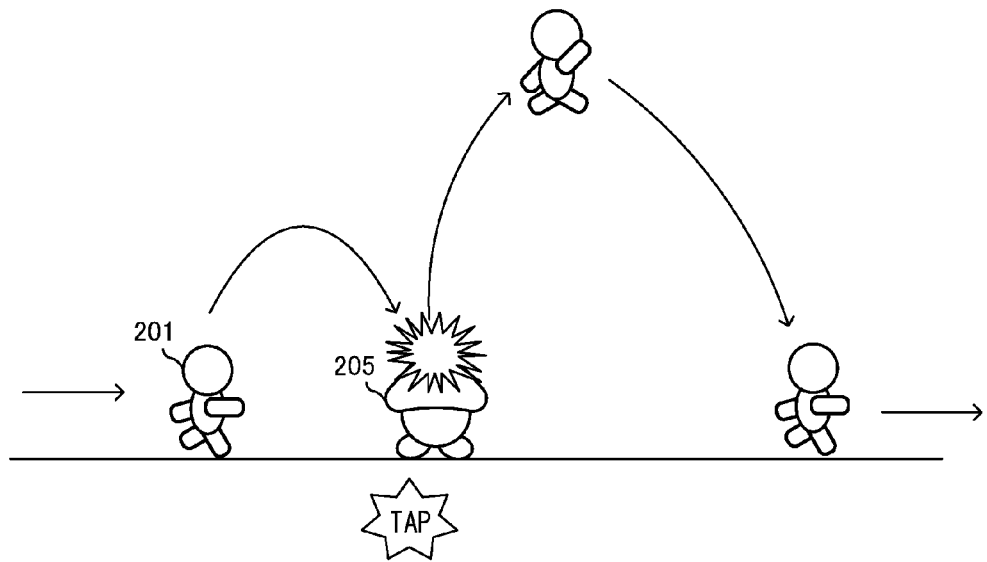
FIG. 5 is a diagram illustrating a non-limiting example of a special manual action.

Here, if the player performs a tap operation at an appropriate timing during the "leapfrog" (while the leapfrog motion is being displayed), the player can cause the player character 201 to perform a special manual action. Specifically, as shown in FIG. 5, the player character 201 performs, as the "special manual action", an attack in which the player character 201 stomps and jumps on the enemy character 205. In this case, since the enemy character 205 is attacked, the enemy character 205 can be damaged. Thus, it is possible to cause the player character 201 to perform a special manual action by performing a tap operation under a predetermined condition (in this example, at a timing when the motion of the automatic action is being displayed). It is noted that other processes when the special manual action is performed will be described later.

Figure 6:
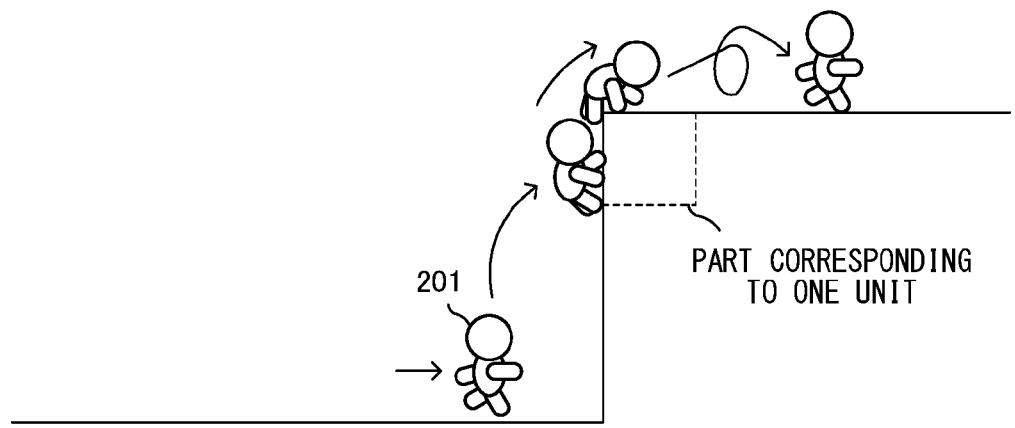
FIG. 6 is a diagram illustrating a non-limiting example of an automatic action.
Figure 7:
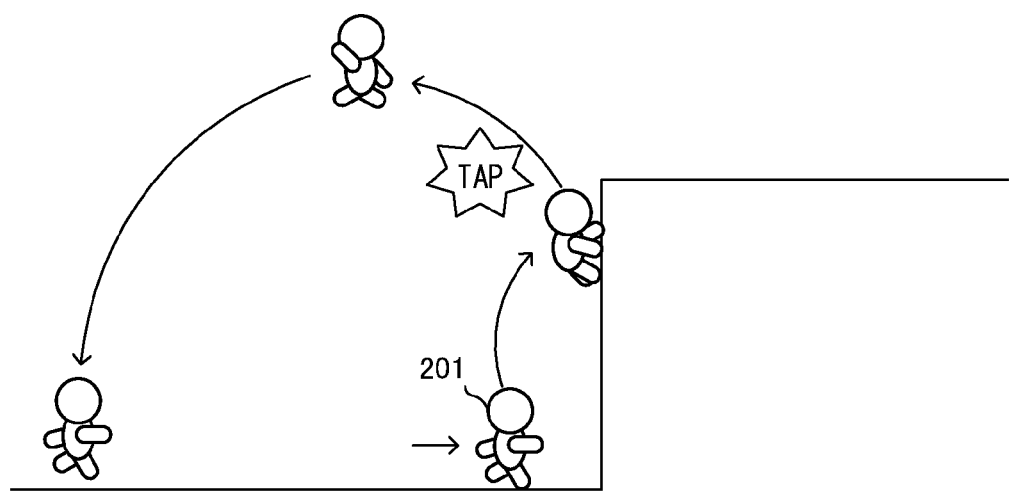
FIG. 7 is a diagram illustrating a non-limiting example of a special manual action.

Other examples of the automatic actions and the special manual actions will be described with reference to FIG. 6 and FIG. 7. FIG. 6 and FIG. 7 show examples in which the player character 201 encounters a wall (or, for example, an obstacle such as a pipe). In the example shown in FIG. 6, an action of clambering the wall is performed as an automatic action. In FIG. 6, the player character 201 automatically moves to approach the wall. If the player does not perform any operation in this state, the player character 201 comes into contact with the wall and once stops moving (becomes unable to advance, by being hampered by the high wall as an obstacle). At this position (or at a time when the player character 201 approaches the wall to a certain extent), if the player performs a tap operation, the player character 201 performs a jump. Then, when the player character 201 comes close to or into contact with an upper end part, of the wall, that corresponds to one unit, the player character 201 performs a motion of holding on the wall and in this state, clambering the upper end part of the wall, and then, after finishing the clambering, rolling forward. In other words, an automatic action of clambering while holding on the upper end part of the wall is performed.

On the other hand, in a state in which the player character 201 is in contact with the wall (and not in contact with the ground), if the player performs a tap operation, as shown in FIG. 7, the player character 201 performs a special manual action of kicking the wall and jumping obliquely backward (wall-kick jump). At this time, the player character 201 temporarily moves in a direction opposite to the advancing direction of the automatic movement. Along with this, the display area is also scrolled in the opposite direction. Then, after landing on the ground, the player character 201 moves in the advancing direction again.

As described above, in this game, if a condition that the player and another object (enemy character or terrain object) have a predetermined positional relationship is satisfied, an automatic action defined in advance is performed. In addition, it is possible to cause the player character to perform a special manual action by the player performing a tap operation under a predetermined condition (for example, at a timing when a specific automatic action is being performed) (it is noted that, not including all the automatic actions, some of the plurality of automatic actions are defined in advance as conditions for executing the special manual actions). From the perspective of operation, the special manual actions can be executed by a tap operation as in the normal manual action, but from the perspective of content, the special manual actions are actions different from the normal manual action. That is, two types of actions, the normal manual action and the special manual action, are assigned to the tap operation which is a simple operation.

Next, the fever meter 203 shown in FIG. 2 and effects (process) by performing the special manual action will be described. In this game, by performing the special manual action as described above, the fever meter 203 is filled by a predetermined amount. That is, points in the fever meter can be accumulated by a predetermined amount. Regarding the amount that can be accumulated, a "weight (coefficient)" is set for each special manual action, and the amount that can be accumulated varies in accordance with the "weight". When the fever meter 203 is filled to the maximum, a "fever mode" is executed for a certain period (for example, 10 seconds). In other words, when the points in the fever meter reach a predetermined value, the fever mode is executed. When the fever mode is executed, parameters of the player character 201 are changed. For example, the movement speed of the player character increases. In addition, the number of coins that can be obtained from a "?" block described later increases. That is, a process that makes an advantageous condition for the player is executed during a certain period. Therefore, the player can collect many coin objects 202 within a short time by causing many special manual actions and swiftly starting the fever mode. When the fever mode is entered, the remaining time of the fever mode may be indicated. Alternatively, the filled gauge may be indicated so as to be gradually depleted over time. That is, the remaining time of the fever mode may be presented to the player directly or indirectly. In the case where the fever mode has not been entered yet, the value of the fever meter that has been filled thus far may be indicated in a form of "current value/maximum value", for example. Further, the time of the fever mode may be allowed to be refilled or prolonged by performing the special manual action during the fever mode. When the above certain period elapses, the fever meter is reset, and the fever meter can be filled again by performing the special manual action.

When the special manual action is performed, as well as increase in the fever meter 203, the following process is performed. That is, by causing the special manual action, a predetermined number of points called "bonus points" can be acquired. The significance of the "bonus points" is that, when the player voluntarily causes an action by a higher level of operation than for the normal manual action, this act is "commended" or "admired". In other words, when the player performs a "cool action" which is not a mere jump operation like the normal manual action, this act is evaluated in a form of bonus point to raise the player's motivation. This also means that a bonus point or the like is added (given) for the special manual action itself (a bonus point or the like is not added for the normal manual action and the automatic action). That is, unlike the case where, for example, as a result of performing an action of jumping, the player character comes into contact with a coin object 202 and acquires the coin, acquisition of a point or the like due to the special manual action is performed by a bonus point or the like being added for the special manual action itself. In this game, on the result screen, the bonus points are added to the acquired coins, to calculate a final score. Thus, the player is provided with enjoyment of how to make special manual actions (acquire bonus points together with coins) while attempting to clear a course using automatic actions and normal manual actions.

As described above, in this game, movement of the player character 201 is automatic, and basically, the player's operations are only a tap operation. Further, by using the special manual action in addition to the automatic action and the normal manual action as described above, it is possible to provide a deep game property while using a simple operation.

(Gimmick Blocks)

In this came, various types of "gimmick blocks" are arranged in a game course in order to enhance the game property. The gimmick block is a block for which some "contrivance (gimmick)" is set. In the exemplary embodiment, when the gimmick block and the player character 201 enter into a predetermined positional relationship in the virtual game space, the gimmick is actuated. Alternatively, when a tap operation is further received from the player under the predetermined positional relationship, the gimmick is actuated. Examples of the predetermined positional relationship are as follows: the player character 201 stands above the gimmick block; the player character 201 overlaps the gimmick block; the player character 201 comes into contact with the gimmick block from a predetermined direction; and the player character 201 approaches within a predetermined distance from the gimmick block. Characteristic gimmick blocks in this game will be described below. Specifically, the following four types of gimmick blocks will be described.

Figure 8:
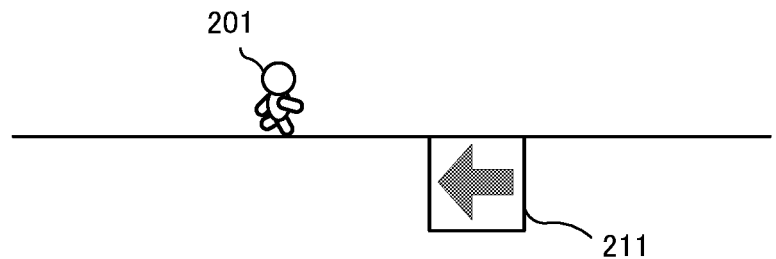
FIG. 8 is a diagram illustrating a non-limiting example of a reverse arrow block.
Figure 9:
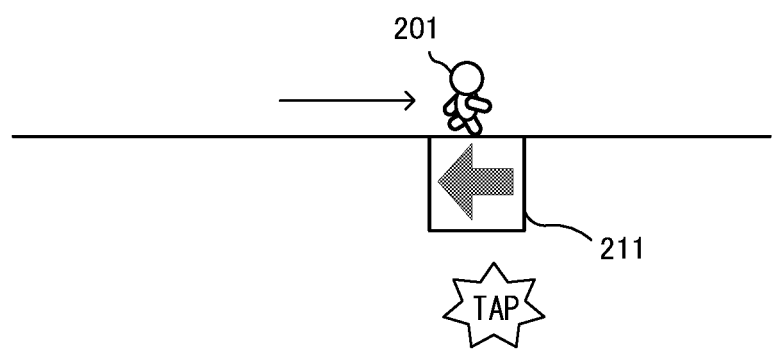
FIG. 9 is a diagram illustrating a non-limiting example of the reverse arrow block.
Figure 10:
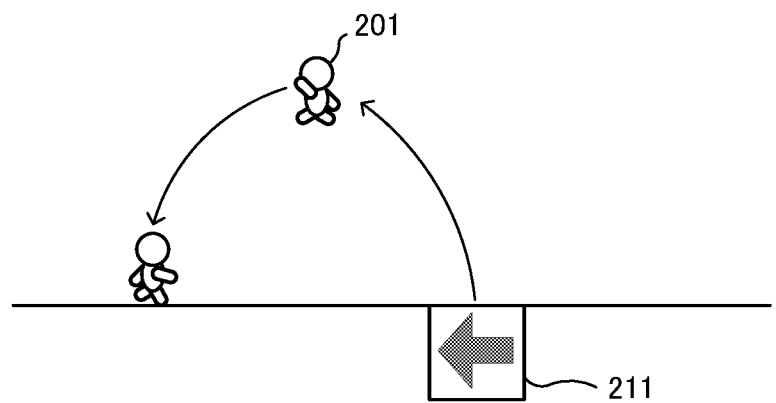
FIG. 10 is a diagram illustrating a non-limiting example of the reverse arrow block.

(1) Reverse arrow block
(2) Dotted-line block
(3) Pause block
(4) "?" (question)" block
(1) Reverse Arrow Block With reference to FIG. 8 to FIG. 10, the reverse arrow block will be described. As described above, this game is a side-scrolling jump action game in which the player character 201 automatically advances in the rightward direction on the screen. However, by using the reverse arrow block, it is possible to temporarily move the player character 201 in a direction opposite to the advancing direction (or in a predetermined direction having the opposite direction component). This will be described with reference to the drawings. First, as shown in FIG. 8, it is assumed that a reverse arrow block 211 is present on a passage surface (ground part) in the advancing direction of the player character 201. The reverse arrow block 211 is a block in which a leftward arrow (arrow opposite to the automatic advancing direction) is drawn. Then, as shown in FIG. 9, when the player character 201 stands above the reverse arrow block 211 (more exactly, the player character 201 is positioned above the reverse arrow block 211 in the virtual game space), if the player performs a tap operation, as shown in FIG. 10, the player character 201 jumps in an obliquely upward direction opposite to the advancing direction. Along with this, the screen is also temporarily scrolled in the opposite direction (because the virtual camera follows movement of the player character 201). Thereafter, when the player character 201 lands on the ground, the player character 201 starts automatic movement in the advancing direction again. On the other hand, if the player does not perform a tap operation when the player character 201 is above the reverse arrow block 211, the player character 201 can pass by the reverse arrow block 211 without jumping. It is noted that the direction in which the player character 201 moves (jumps) is not limited to the obliquely upward direction opposite to the advancing direction, but may be any direction that contains a direction component opposite to the advancing direction.

Thus, by using the reverse arrow block, it becomes possible to provide variations in advancement route even in such a forced scrolling game as in this game. For example, in a course configuration as shown in FIG. 11, the player character advances to a lower course X as long as the player does not perform any operation. However, if the player character once jumps to a position "A" using the reverse arrow block 211 and then jumps to a position "B" by the normal manual action, the player character can advance to an upper course Y. Thus, it is possible to provide variations by providing a branch point in a course.

(2) Dotted-Line Block

Figure 12:
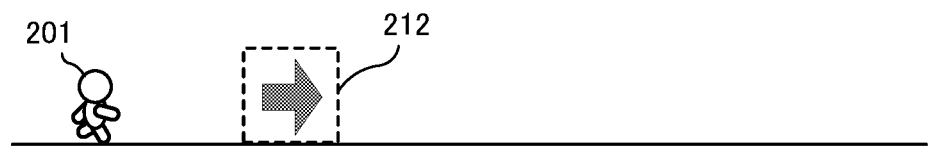
FIG. 12 is a diagram illustrating a non-limiting example of a dotted-line block.
Figure 13:
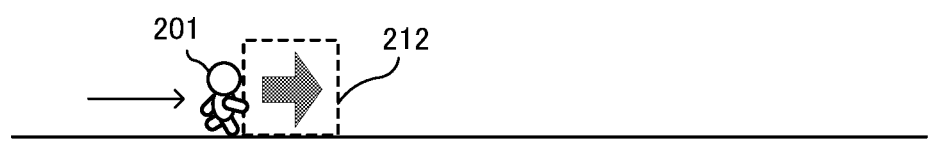
FIG. 13 is a diagram illustrating a non-limiting example of the dotted-line block.
Figure 14:
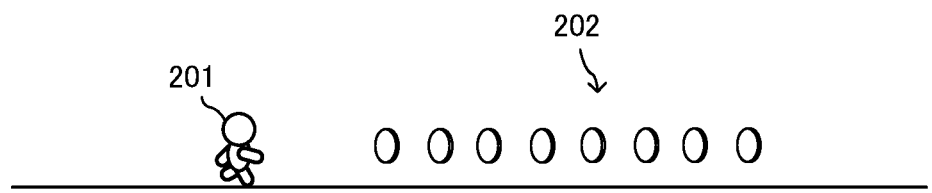
FIG. 14 is a diagram illustrating a non-limiting example of the dotted-line block.

With reference to FIG. 12 to FIG. 14, a dotted-line block will be described. A dotted-line block 212 shown in FIG. 12 is a block which has a dotted-line contour and in which a predetermined-direction arrow is indicated. When the player character 201 comes into contact with the dotted-line block 212 as shown in FIG. 13, the dotted-line block 212 causes a plurality of coin objects 202 to appear along the direction of the arrow indicated in the block as shown in FIG. 14 (at this time, the dotted-line block 212 disappears). In other words, the dotted-line block 212 is associated with the direction indicated by the predetermined-direction arrow. When the dotted-line block 212 and the player character 201 come into contact with each other, the coin objects 202 appear in the direction (position) corresponding to the arrow. That is, the coin objects 202 are caused to appear at a predetermined position in the direction indicated by the arrow from the dotted-line block 212 as a reference (as seen from the dotted-line block 212).

Figure 15:
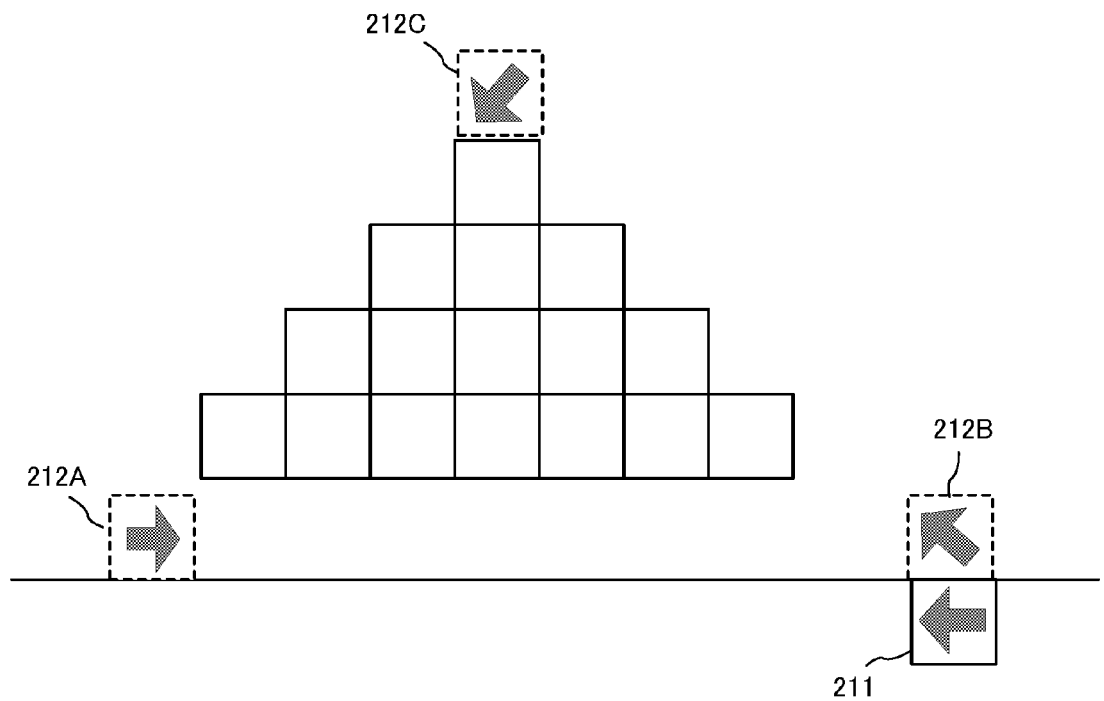
FIG. 15 is a diagram illustrating a non-limiting example in which the reverse arrow block and the dotted-line block are used in combination.
Figure 16:
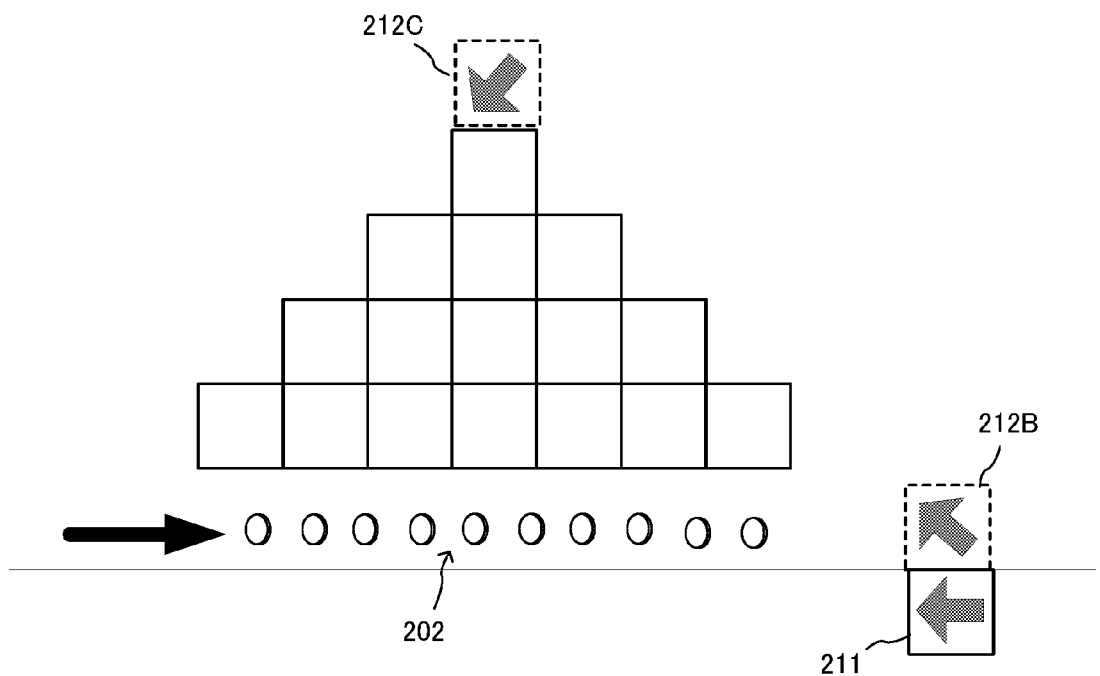
FIG. 16 is a diagram illustrating a non-limiting example in which the reverse arrow block and the dotted-line block are used in combination.
Figure 17:
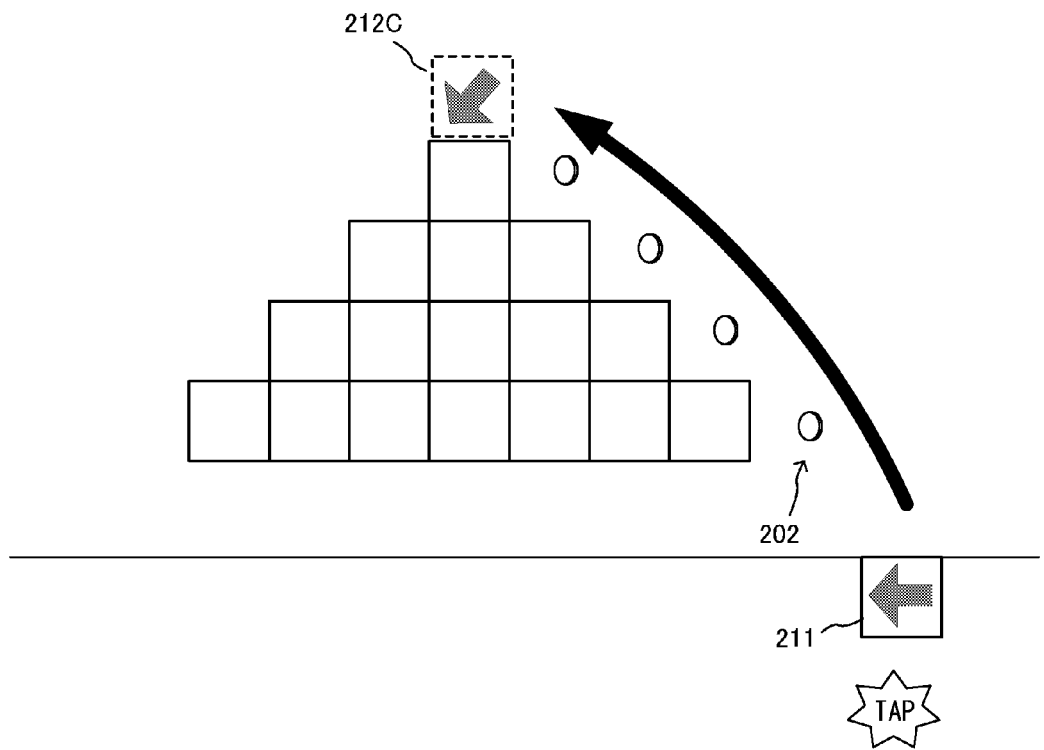
FIG. 17 is a diagram illustrating a non-limiting example in which the reverse arrow block and the dotted-line block are used in combination.
Figure 18:
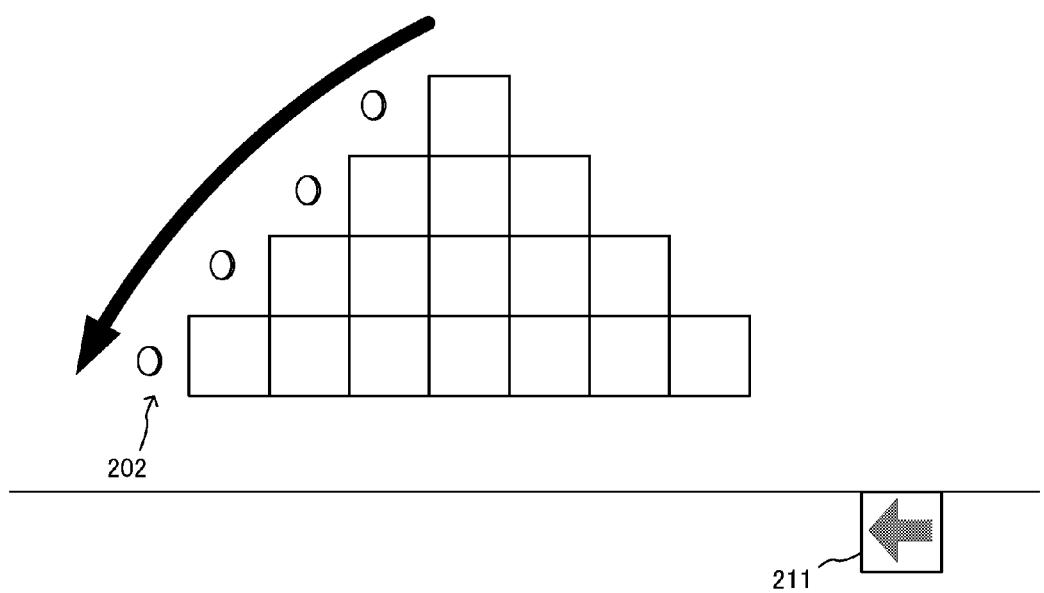
FIG. 18 is a diagram illustrating a non-limiting example in which the reverse arrow block and the dotted-line block are used in combination.

FIG. 15 to FIG. 18 show examples in which the reverse arrow block and the dotted-line block are used in combination. In FIG. 15, a group of blocks as obstacle objects are present substantially in a triangular shape. Dotted-line blocks 212A, 212B, 212C are arranged at positions near the three vertices of the substantially triangular block group. In the dotted-line block 212A, an arrow (rightward direction) along the advancing direction is indicated. In the dotted-line block 212B, an arrow in an obliquely leftward and upward direction is indicated. In the dotted-line block 212C, an arrow in an obliquely leftward and downward direction is indicated. In addition, a reverse arrow block 211 is located under the dotted-line block 212C (in the ground part). In such an arrangement, when a player character (not shown) moves from the left in the drawing, first, the player character comes into contact with the dotted-line block 212A, and then, as shown in FIG. 16, coin objects 202 appear along the lower side of the substantially triangular block group (at the same time, the dotted-line block 212A disappears). Thereafter, when the player character comes into contact with the dotted-line block 212B, as shown in FIG. 17, coin objects 202 appear along the right side of the substantially triangular block group. In addition, at the same time as the coin objects 202 appear, the dotted-line block 212B disappears (it is noted that, instead of disappearance, the display manner of the block may be changed, e.g., the display of the block may be faded or grayed-out, so that the player can recognize that the coins have been already appeared). Then, at this timing (when the player character stands above the reverse arrow block 211), if the player performs a tap operation, the player character 201 can be caused to jump in an obliquely leftward and upward direction, whereby the coin objects 202 can be acquired (on the other hand, if the player does not perform a tap operation, the player character moves forward without acquiring these coin objects 202). Further, as a result of the jump, the player character 201 comes into contact with the dotted-line block 212C, and as shown in FIG. 18, coin objects appear along the left side of the substantially triangular block group (at the same time, the dotted-line block 212C disappears). As the jumping player character falls (moves in an obliquely leftward and downward direction), the player character can acquire the coin objects 202 that have appeared. Then, when the player character 201 lands on the ground, the player character 201 automatically starts to move in the advancing direction again. Such an arrangement can provide the player with a chance to acquire more coin objects 202, thereby enhancing amusement of the game.

Without limitation to the case where the coin objects 202 appear when the player character 201 comes into contact with the dotted-line block 212, in other exemplary embodiments, the coin objects 202 may be caused to appear when the dotted-line block 212 and the player character 201 enter into a predetermined positional relationship, e.g., when the player character 201 approaches the dotted-line block 212 to a certain extent. In addition, also regarding the number of coins caused to appear, without limitation to the case of causing a plurality of coins to appear as described above, only one coin object 202 may be caused to appear.

(3) Pause Block

Figure 19:
FIG. 19 is a diagram illustrating a non-limiting example of a pause block.
Figure 20:
FIG. 20 is a diagram illustrating a non-limiting example of the pause block.
Figure 21:
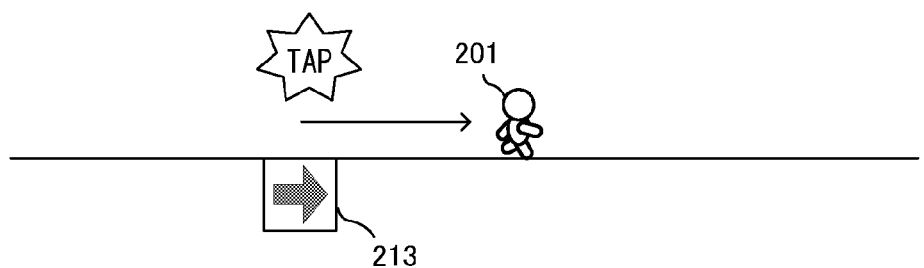
FIG. 21 is a diagram illustrating a non-limiting example of the pause block.

Next, with reference to FIG. 19 to FIG. 21, the pause block will be described. As described above, this game is a side-scrolling jump action game in which the player character 201 automatically moves in the rightward direction on the screen. The pause block is capable of temporarily stopping automatic movement of the player character 201. A pause block 213 shown in FIG. 19 is located in the ground part. In the pause block 213, a pattern in which two vertical bars are arranged is indicated. When the player character 201 stands above the pause block 213, as shown in FIG. 20, the pattern of the pause block 213 changes to a rightward-direction arrow and movement of the player character 201 stops. Then, as shown in FIG. 21, if the player performs a tap operation at a desired timing, the temporary stopped state is cancelled and the movement in the direction indicated by the arrow is started. In the case of FIG. 21, movement in the rightward direction is started (restarted).

Figure 22:
FIG. 22 is a diagram illustrating a non-limiting example of the pause block.
Figure 23:
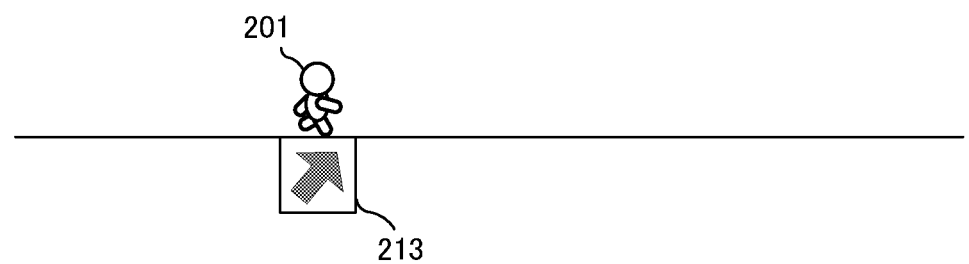
FIG. 23 is a diagram illustrating a non-limiting example of the pause block.
Figure 24:
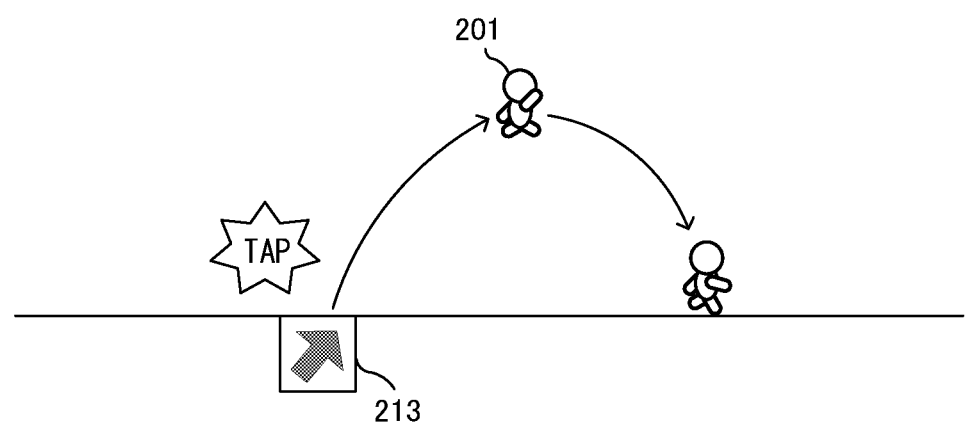
FIG. 24 is a diagram illustrating a non-limiting example of the pause block.

FIG. 22 to FIG. 24 show another example of the pause block. In the example shown in FIG. 22, a pause block 213 has a pattern obtained by obliquely tilting the pattern shown in FIG. 19. In the case of the pause block 213 having such a pattern, when the player character 201 stands above the pause block 213, as shown in FIG. 23, the pattern thereof changes to an arrow in an obliquely rightward and upward direction. Then, when the player performs a tap operation at a desired timing, as shown in FIG. 24, the player character 201 jumps in an obliquely rightward and upward direction. That is, the pause block 213 having the pattern shown in FIG. 22 is a block that causes the player character 201 to jump when the movement thereof is restarted after the temporary stoppage.

Figure 25:
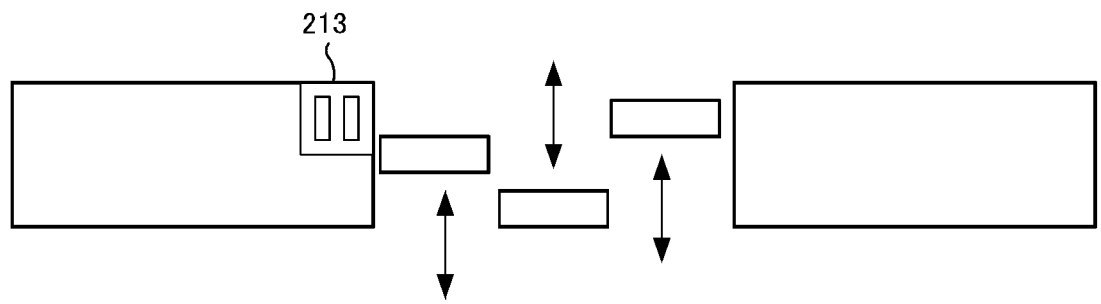
FIG. 25 is a diagram illustrating a non-limiting example of utilization of the pause block.

FIG. 25 shows an example of utilization of the pause block as shown in FIG. 19. In FIG. 25, a ground part in the advancing direction is broken off, and at the broken part, a plurality of "moving platforms" are arranged each of which reciprocates in the up-down direction. The player can stop the player character 201 by the pause block 213 and restart movement of the player character (perform a tap operation) at an appropriate timing when these "moving platforms" are aligned side by side.

Figure 26:
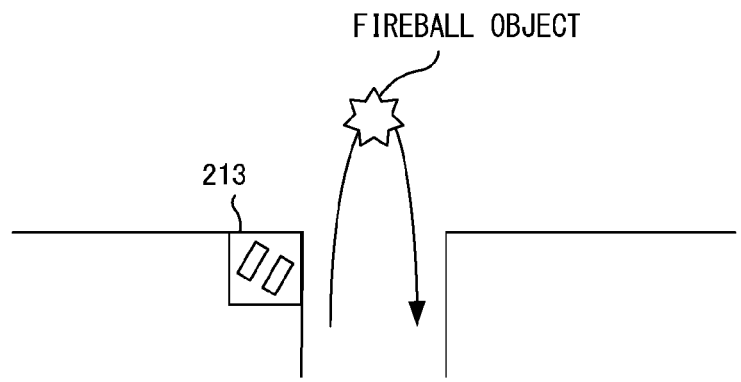
FIG. 26 is a diagram illustrating a non-limiting example of utilization of the pause block.

FIG. 26 shows an example of utilization of the pause block shown in FIG. 22. In this example, a ground part in the advancing direction is broken off as in the above case, and a fireball object having a damage effect moves to reciprocate in the up-down direction at the broken part. The player can cause the player character to advance so as to jump over the broken part, by performing a tap operation at an appropriate timing so that the player character will not collide with the fireball object. In any of the above cases, an element of causing the player to take an appropriate advancement timing is provided in a game in which, basically, a player character moves automatically, whereby amusement of the game can be further enhanced.

In another exemplary embodiment, without limitation to the case of standing above the pause block, the movement may be temporarily stopped as described above when the player character 201 and the pause block enter into a predetermined positional relationship, e.g., when the player character 201 comes directly under the pause block (they enter into such a positional relationship that the pause block is positioned directly above the player character 201). In this case, the distance between the player character 201 and the pause block may be, for example, such a close distance that they can be said to be neighboring on or adjacent to each other, or may be a distance farther than this.

In the above examples, the case where the player character 201 stands "above" the pause block and the case where the player character 201 comes "under" the pause block, have been shown. However, these terms do not need to strictly mean "above" and "under". These terms may include some margin in the front-back direction (right-left direction), and for example, may include the case where only a part of the player character 201 enters a region "above" the pause block. In addition, the case where the pause block is present at a position shifted in the front-back direction from the player character 201 within such a range that can be said to be the neighborhood of the player character 201, e.g., within a range (distance) corresponding to, for example, one unit from the player character 201 as a reference, may be treated as a predetermined positional relationship as described above (it is noted that, regarding the positional relationship, the same applies also to the reverse arrow block).

(4) "?" Block

Figure 27:
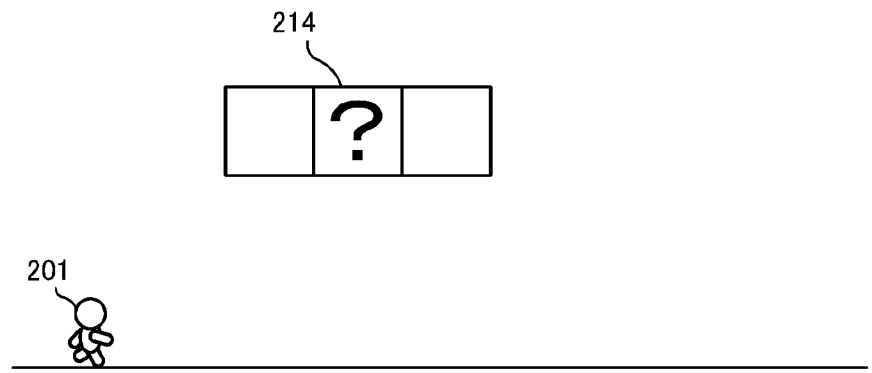
FIG. 27 is a diagram illustrating a non-limiting example of a "?" block.
Figure 28:
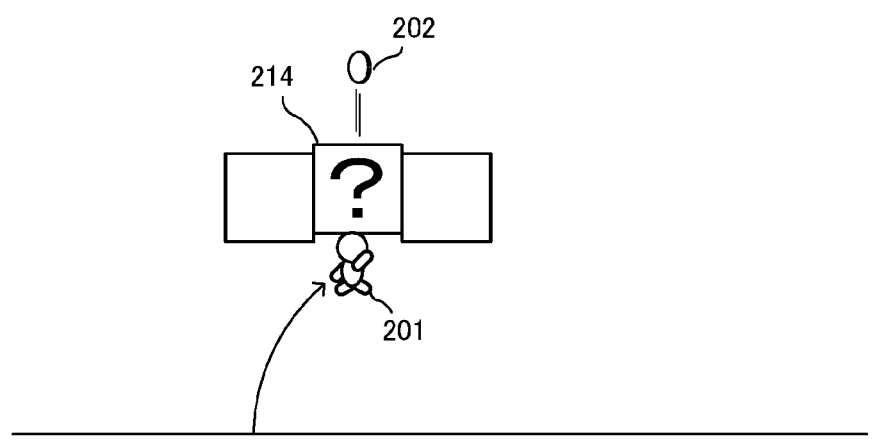
FIG. 28 is a diagram illustrating a non-limiting example of the "?" block.
Figure 29:
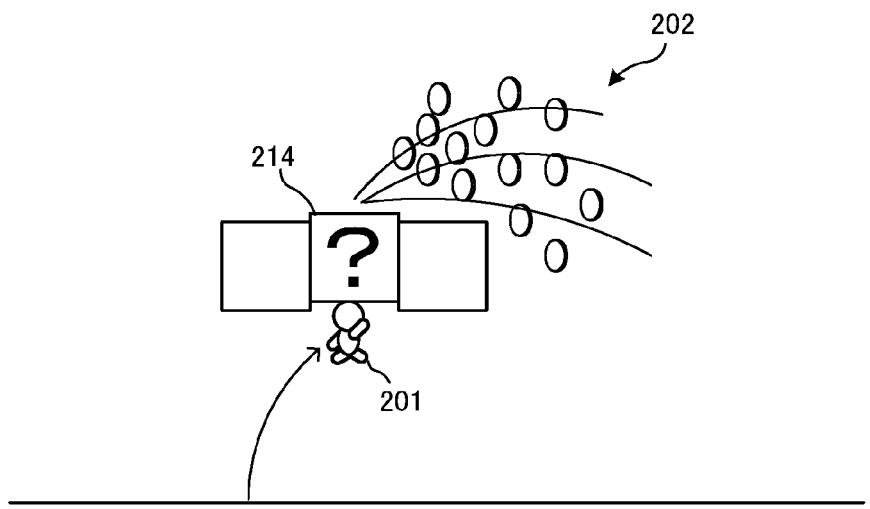
FIG. 29 is a diagram illustrating a non-limiting example of the "?" block.

Next, with reference to FIG. 27 to FIG. 29, the "?" block will be described. This block is a block that causes the coin object 202 to appear by the player character 201 coming into contact with the block from below. It is noted that the number of coins to appear varies in accordance with whether or not the aforementioned fever mode is entered. In FIG. 27, a pattern "?" is indicated in a "?" block 214. When the fever mode is not entered, by the player character 201 coming into contact with the "?" block 214 from below (hit from below), as shown in FIG. 28, only one coin object 202 appears directly upward and thus the coin object 202 can be acquired (in another exemplary embodiment, the coin object 202 may be acquired by the player character 201 coming into contact with the coin object 202). On the other hand, in the fever mode, when the block is hit from below, as shown in FIG. 29, a plurality of coin objects 202 appear so as to be scattered in the advancing direction of the player character 201. In addition, since the coin objects 202 are scattered in the advancing direction, these coin objects 202 can be easily collected (acquired). Thus, the "?" block 214 is configured such that the number of coins that can be acquired can be changed in accordance with whether or not the fever mode is entered, whereby amusement of the game can be further enhanced.

As described above, a condition for actuating each gimmick set for the respective gimmick blocks described above is that the gimmick block and the player character 201 are in a predetermined positional relationship or that a tap operation from the player is further received in a state in which the predetermined positional relationship is satisfied. That is, each gimmick set for the respective gimmick blocks is actuated in response to satisfaction of such a condition.

Figure 30:
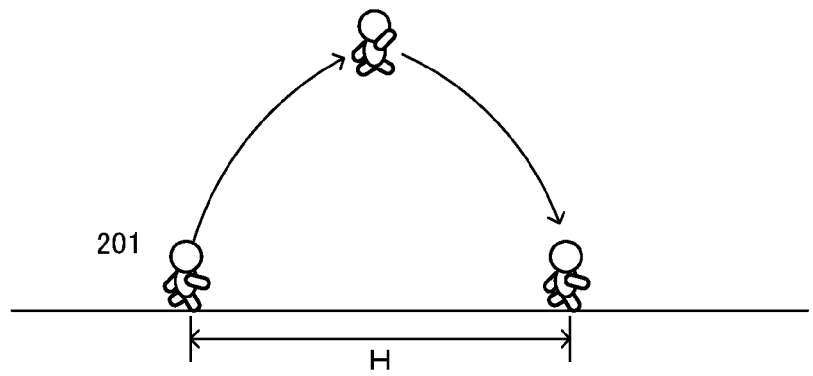
FIG. 30 is a diagram illustrating a non-limiting example of operation of a player character.
Figure 31:
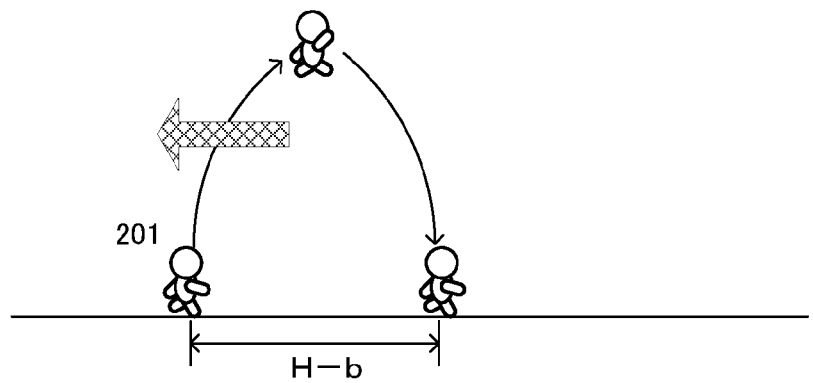
FIG. 31 is a diagram illustrating a non-limiting example of operation of a player character.
Figure 32:
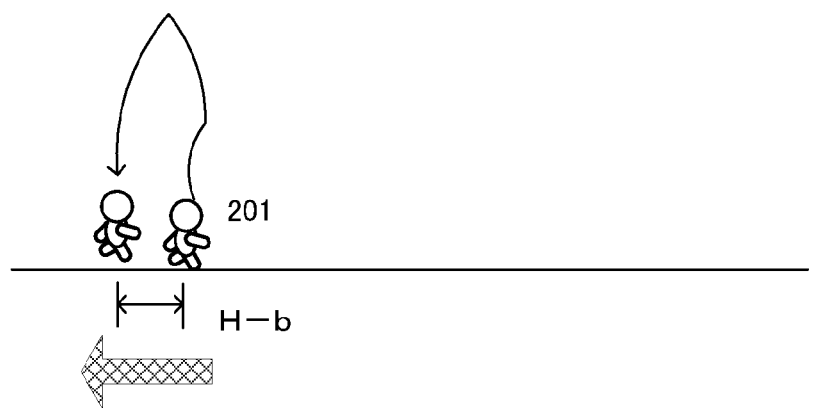
FIG. 32 is a diagram illustrating a non-limiting example of operation of a player character.

Next, operations of the player character other than the tap operation as described above will be described. In this game, as described above, it is possible to cause the player character to perform the normal manual action or the special manual action by a tap operation. Other than such an operation, in this game, it is possible to apply a "brake" to the jump movement by an operation of moving a touch position while keeping the touching. Specifically, by performing such an operation in a direction opposite to the advancing direction during a jump, a "brake" can be applied to the jump movement. Hereinafter, such an operation is referred to as a slide operation. It is noted that, instead of the slide operation, an operation called a flick or a swipe may be used. FIG. 30 shows an example of a flying distance when a tap operation is merely performed. This example shows that the player character can move by a flying distance H by a jump. FIG. 31 shows an example in which the player performs a slide operation in the leftward direction (opposite to the advancing direction) immediately after the tap operation. In this case, the movement speed of the player character 201 during the jump is slowed down in accordance with the content of the slide operation (e.g., the amount of the sliding). As a result, the flying distance becomes shorter than that in FIG. 30 by a distance b (the length of the distance b is determined in accordance with the content of the slide operation). FIG. 32 shows an example in which, when the player character 201 is on the ground, a slide operation is performed from the beginning, instead of a tap operation. In this case, the player character 201 starts to jump in response to detection of touch-on in the slide operation, and at the same time as the start of the jump, speed reduction according to the content of the slide operation is also performed. As a result, the movement trajectory of the player character 201 is such that the player character 201 jumps and moves slightly in the advancing direction and then rises so as to move backward, and after reaching the top, the player character 201 falls backward. As a result, the player character 201 lands on the ground slightly backward from the point at which the jump is started.

As described above, the game according to the exemplary embodiment increases variations of play content even by a simple operation of the tap operation, and thus can provide a deep game property.

Next, with reference to FIG. 33 to FIG. 44, the details of a game process in the exemplary embodiment will be described.

FIG. 33 shows an example of a program and information stored in the main memory 113 of the smart device 102. The main memory 113 stores a game process program 301, operation data 302, current state data 303, a fever meter value 304, acquired coin number data 305, acquired bonus point data 306, player character data 307, enemy character data 311, terrain object data 312, gimmick block data 313, course data 314, and the like.

The game process program 301 is a program for executing a game process as described above. Specifically, this program is a program for executing a flowchart process shown in FIG. 34 and FIG. 35 described later.

The operation data 302 indicates various operations performed on the smart device 102. In the exemplary embodiment, the operation data 302 includes button data and touch panel data. These data are data indicating the contents of operations performed on the operation section 115, and indicating the press state of each button, touch coordinates on the touch panel, the touch continuation period, and the like.

The current state data 303 indicates the current state of the player character 201 during the game. Specifically, this data indicates which of the following states the player character 201 is in. The states indicated by this data include at least the following five states: (a) a state of moving automatically (normal movement state); (b) a state in which the automatic action is being executed (automatic action state); (c) a state in which the normal manual action is being executed (normal manual action state, in this game, the normal manual action is, substantially, only a "jump"); (d) a state in which the special manual action is being executed (special manual action state); and (e) the movement is temporarily stopped (temporary stopped state). It is noted that the "normal movement state" is set as an initial value.

The fever meter value 304 is data indicating the value of the fever meter 203 shown in FIG. 2. The acquired coin number data 305 indicates the number of coin objects 202 acquired by the player character 201. The acquired bonus point data 306 indicates the number of the acquired bonus points. (These data are initialized at the start of playing each game course.)

The player character data 307 is data for displaying the player character 201. The player character data 307 includes automatic action motion data 308 which defines the motions of the automatic actions described above, normal manual action motion data 309 which defines the motion of the normal manual action, and special manual action motion data 310 which defines the motions of the special manual actions. These motion data define animation patterns, for example. In addition, for example, in the automatic action motion data 308, motion data of a plurality of automatic actions are stored such that the plurality of automatic actions can be respectively identified (the same applies to the motion data of the normal manual action and the special manual actions). Besides, the player character data 307 can include also various data about the player character 201.

The enemy character data 311 defines (plural types of) enemy characters. The enemy character data 311 includes data indicating the outer appearances of the enemy characters, information indicating the action contents (ways of behaviors) of the enemy characters, information indicating whether or not each enemy character is a target of the automatic action, and the like. Hereinafter, for convenience of description, an enemy character that is a target of the automatic action may be referred to as a "first-type enemy character", and an enemy character that is not a target of the automatic action may be referred to as a "second-type enemy character".

The terrain object data 312 is data about various terrain objects constituting game courses. The terrain object data 312 includes data indicating the outer appearances of the terrain objects, information indicating whether or not each terrain object is a target of the automatic action (e.g., an upper end part of a high wall as shown in FIG. 6, or a small step part), and the like.

The gimmick block data 313 defines the gimmick blocks as described above. The gimmick block data 313 includes information defining roles, functions, and the like of the four types of gimmick blocks as described above, and also includes information about gimmick blocks other than the above ones.

The course data 314 defines the contents of game courses. The course data 314 includes information indicating terrains in the courses, information indicating arrangements of coin objects, enemy characters, and the gimmick blocks, and the like. On the basis of the course data 314, a game course is generated as appropriate in a virtual game space.

Besides, the main memory 113 also stores, as appropriate, various types of data to be used in a game process, such as an advancing direction parameter indicating the movement direction (advancing direction) of the player character 201, a movement speed parameter indicating the movement speed thereof, a jump distance parameter indicating the aforementioned flying distance of a jump, and a flag indicating whether or not the fever mode is entered.

Figure 34:
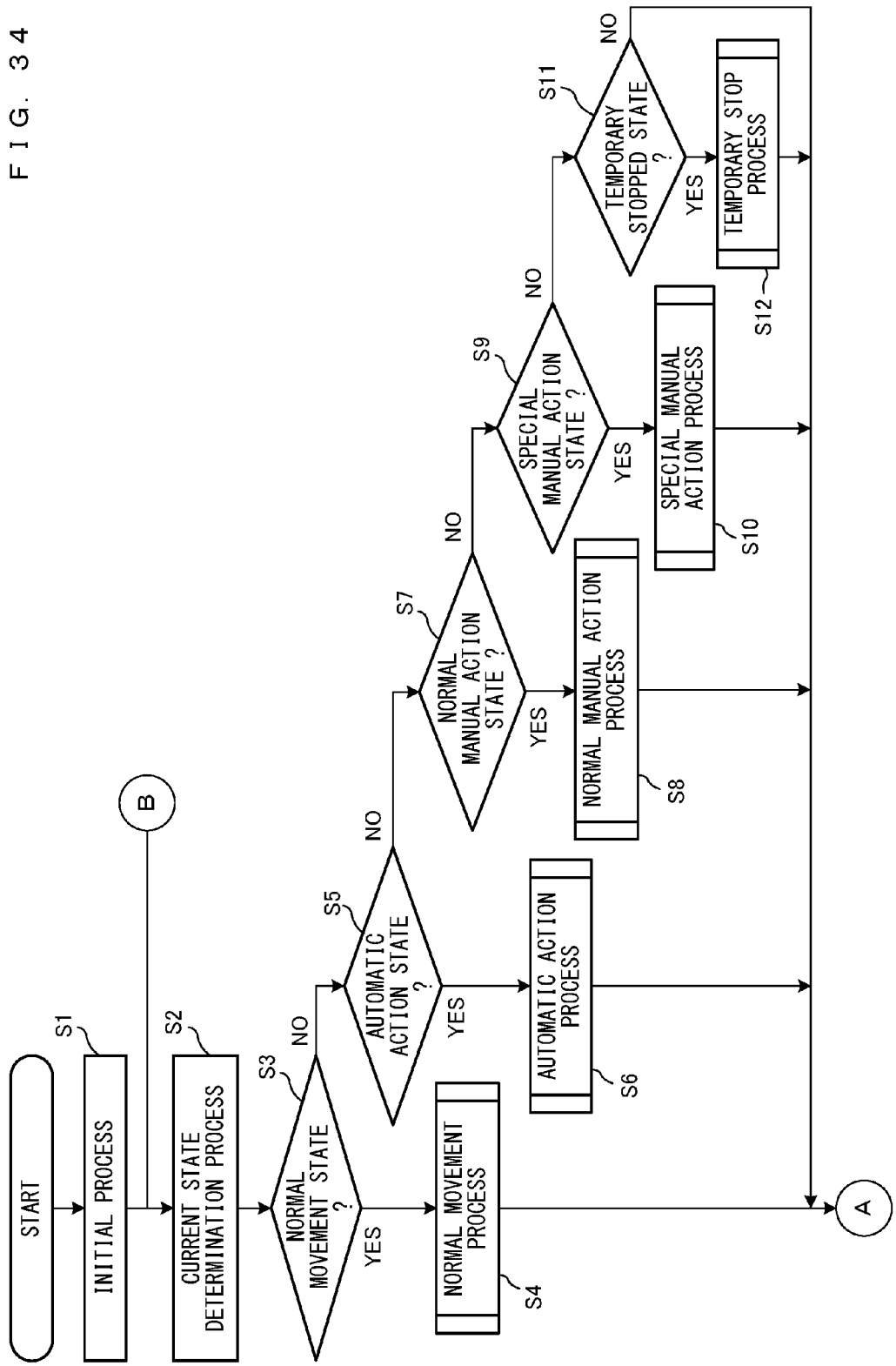
FIG. 34 is a flowchart showing the details of a non-limiting example of a game process.
Figure 35:
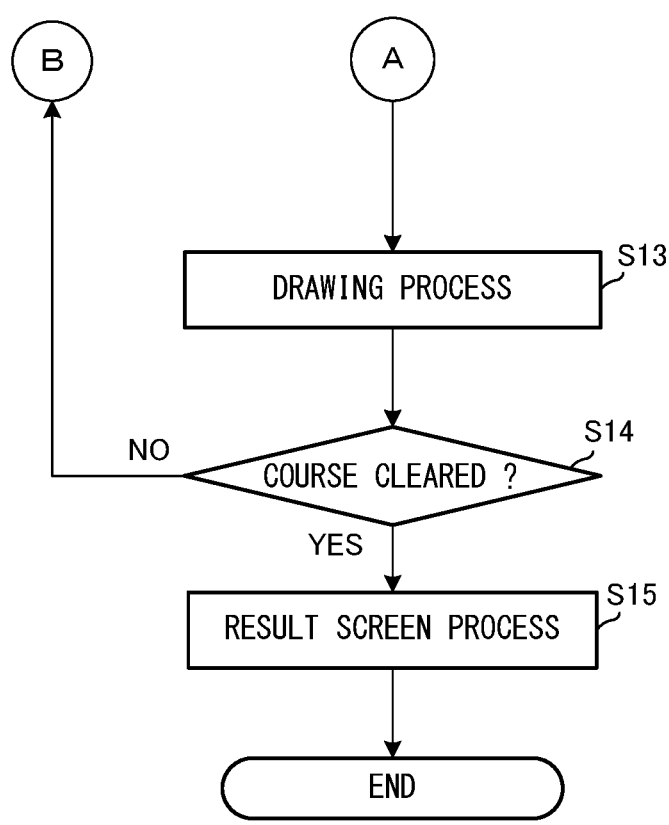
FIG. 35 is a flowchart showing the details of a non-limiting example of the game process.

Next, with reference to flowcharts shown in FIG. 34 and FIG. 35, the flow of a game process executed by the processor section 111 of the smart device 102 will be described. FIG. 34 and FIG. 35 are flowcharts showing the details of the game process. The process is started by, for example, when a predetermined game course selection screen (not shown) is displayed, the player selecting a course to be played and performing a "play start" command operation.

In FIG. 34, first, in step S1, the processor section 111 executes an initial process. In this process, generation of a game course and arrangement of various types of characters and objects are executed on the basis of the course data 314. In addition, a process of initializing various types of data such as the fever meter value 304, the acquired coin number data 305, and the acquired bonus point data 306, is also executed. In addition, a process of setting a "rightward direction" as the initial value of the aforementioned advancing direction parameter and setting a predetermined value as the initial value of the movement speed parameter, and the like are also executed. In addition, a process of displaying, on the screen, a game image obtained by imaging a start point of the course by a virtual camera is also executed.

Next, in step S2, the processor section 111 executes a current state determination process. Specifically, the processor section 111 determines the current state of the player character 201 by referring to the current state data 303.

Next, in step S3, the processor section 111 determines whether or not the current state of the player character 201 is the "normal movement state". As a result, if the current state is the "normal movement state" (YES in step S3), in step S4, a normal movement process is executed. On the other hand, if the current state is not the "normal movement state" (NO in step S3), the process proceeds to step S5 described later.

Figure 36:
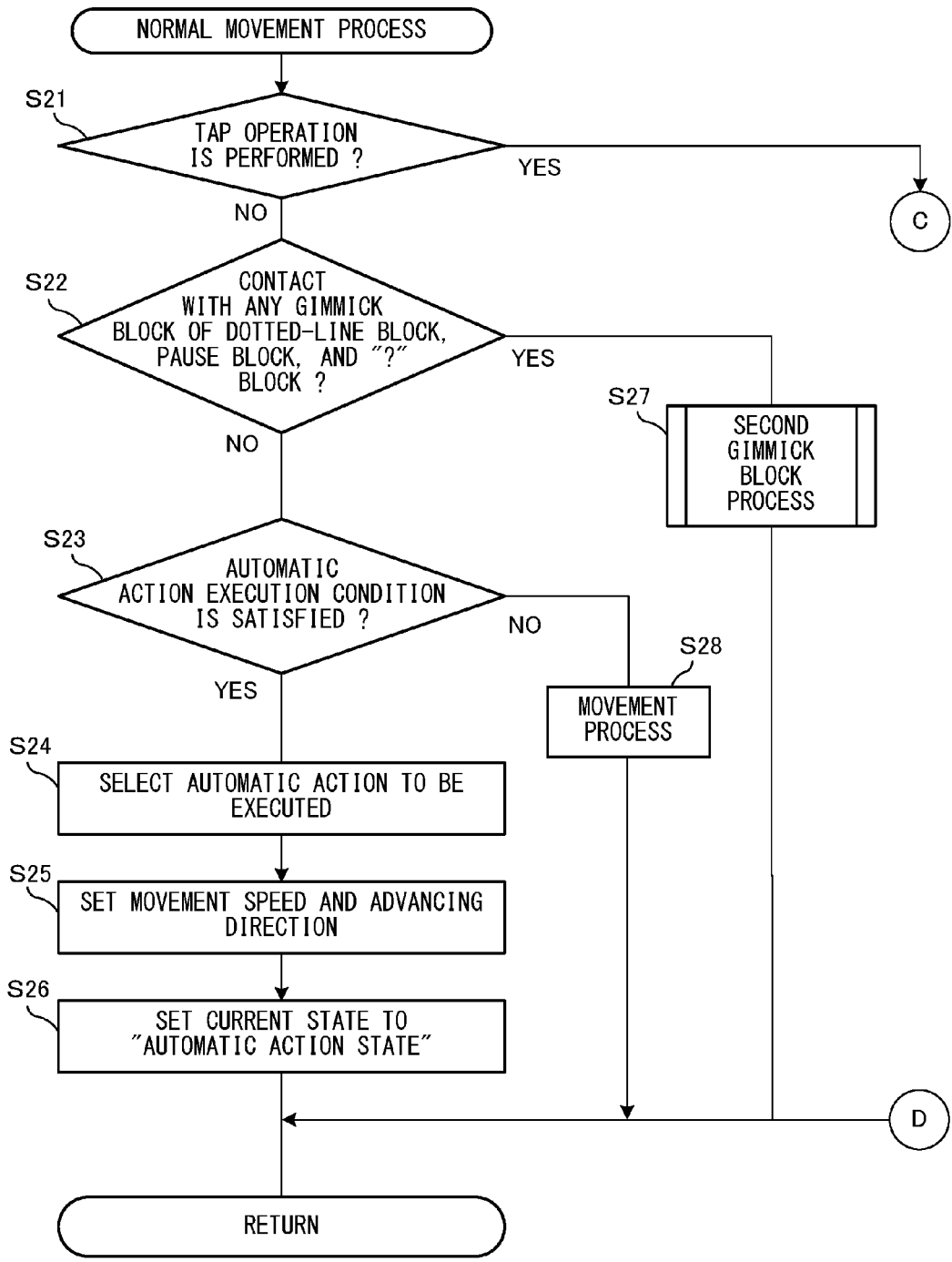
FIG. 36 is a flowchart showing the details of a non-limiting example of a normal movement process.
Figure 37:
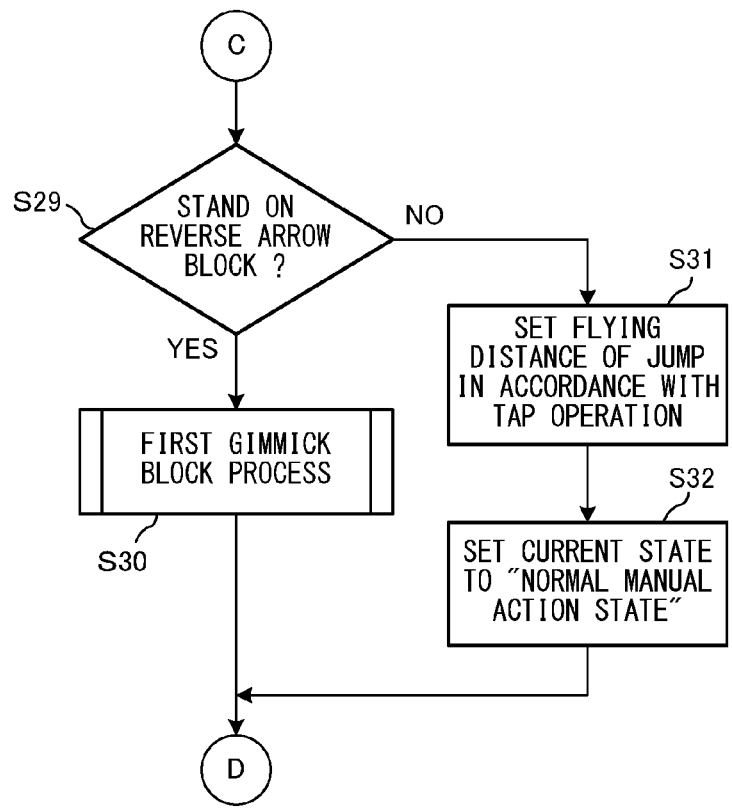
FIG. 37 is a flowchart showing the details of a non-limiting example of the normal movement process.

FIG. 36 and FIG. 37 are flowcharts showing the details of the normal movement process. In FIG. 36, first, in step S21, the processor section 111 determines whether or not a tap operation is performed, by referring to the operation data 302. As a result, if a tap operation is performed (YES in step S21), in step S29 in FIG. 37, the processor section 111 determines whether or not the player character 201 stands above the reverse arrow block 211 (see FIG. 8). As a result, if the player character 201 stands above the reverse arrow block 211 (YES in step S29), in step S30, the processor section 111 executes a first gimmick block process.

It is noted that, regarding detection of the tap operation, in this example, an operation from touch-on to touch-off (within a predetermined period) is treated as a tap operation. In another exemplary embodiment, instead of the tap operation, the determination may be performed on the basis of whether or not touch-on is detected. That is, the process may be performed such that execution of the special manual action or the normal manual action as described later is executed at the time when touch-on is detected.

Figure 38:
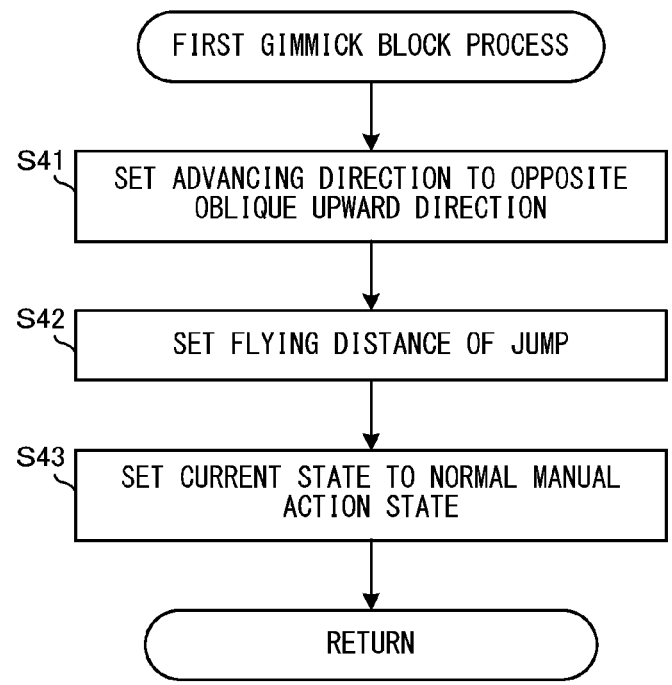
FIG. 38 is a flowchart showing the details of a non-limiting example of a first gimmick block process.

FIG. 38 is a flowchart showing the details of the first gimmick block process. In this process, a process for causing the player character 201 to jump in a direction opposite to the advancing direction is executed. In FIG. 38, first, in step S41, the processor section 111 sets the advancing direction of the player character 201 to an obliquely leftward and upward direction (i.e., obliquely upward direction opposite to the advancing direction). Next, in step S42, referring to the operation data 302, the processor section 111 sets the flying distance of the jump of the player character 201 in accordance with a touch continuation period of the tap operation. Then, in step S43, the processor section 111 sets, in the current state data 303, information indicating a "normal manual action state". Then, the first gimmick block process is ended.

Returning to FIG. 37, after the first gimmick block process is ended, the normal movement process is also ended.

On the other hand, as a result of the determination in step S29, if the player character 201 does not stand above the reverse arrow block 211 (NO in step S29), a process for causing the player character 201 to jump in the advancing direction is performed. Specifically, in step S31, referring to the operation data 302, the processor section 111 sets the flying distance of the jump of the player character 201 in accordance with a touch continuation period of the tap operation. Next, in step S32, the processor section 111 sets, in the current state data 303, information indicating a "normal manual action state". Then, the normal movement process is ended.

Returning to FIG. 36, on the other hand, as a result of the determination in step S21, if a tap operation is not performed (NO in step S21), in step S22, the processor section 111 determines whether or not the player character 201 is in contact with any of the dotted-line block 212, the pause block 213, and the "?" block 214 described above. As a result, if the player character 201 is in contact with any of the gimmick blocks (YES in step S22), in step S27, the processor section 111 executes a second gimmick block process.

Figure 39:
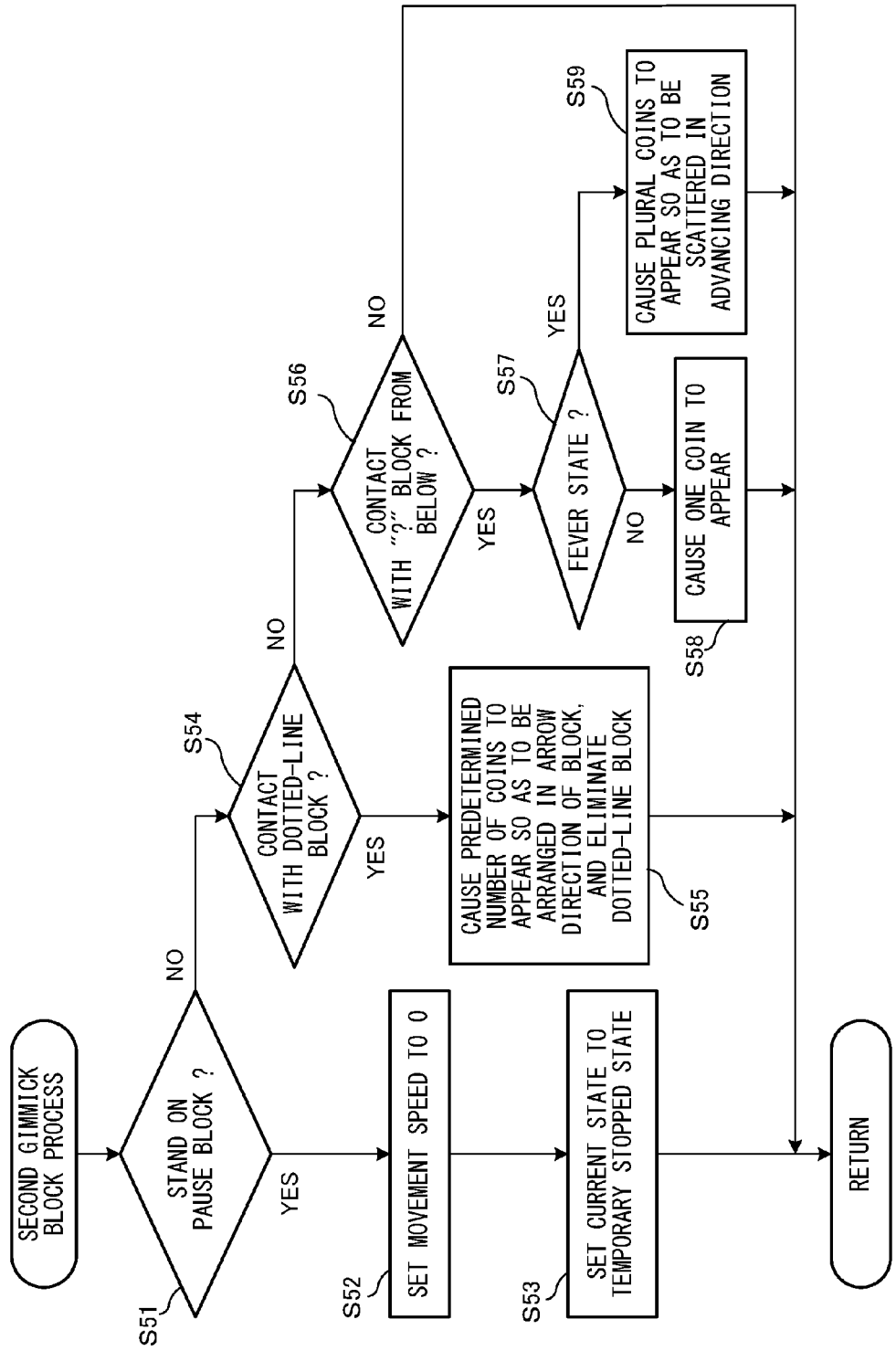
FIG. 39 is a flowchart showing the details of a non-limiting example of a second gimmick block process.

FIG. 39 is a flowchart showing the details of the second gimmick block process. In FIG. 39, first, in step S51, the processor section 111 determines whether or not the player character 201 stands above the pause block 213. As a result of the determination, if the player character 201 stands above the pause block 213 (YES in step S51), in step S52, the processor section 111 performs a process for stopping movement of the player character. That is, in step S52, the processor section 111 executes a process of setting the movement speed of the player character 201 to zero. Next, in step S53, the processor section 111 sets the current state data 303 to a "temporary stopped state".

On the other hand, as a result of the determination in step S51, if the player character 201 does not stand above the pause block 213 (NO in step S51), in step S54, the processor section 111 determines whether or not the player character 201 is in contact with the dotted-line block 212. As a result, if the player character 201 is in contact with the dotted-line block 212 (YES in step S54), in step S55, the processor section 111 performs a process of causing coin objects 202 to appear. Specifically, a process of causing a predetermined number of coin objects 202 to appear so as to be arranged along the arrow direction set (indicated) in the dotted-line block 212, is executed. Further, a process of eliminating the dotted-line block 212 in contact is also executed.

On the other hand, as a result of the determination in step S54, if the player character 201 is not in contact with the dotted-line block 212 (NO in step S54), in step S56, the processor section 111 determines whether or not the player character 201 is in contact with the "?" block 214 from below (in contact with the lower side thereof). As a result, if the player character 201 is not in contact with the "?" block 214 from below (NO in step S56), the second gimmick block process is ended. If the player character 201 is in contact with the "?" block 214 from below (YES in step S56), in step S57, the processor section 111 determines whether or not the "fever mode" is being executed. As a result, if the "fever mode" is not entered (NO in step S57), in step S58, the processor section 111 executes a process of causing only one coin object 202 to appear from the "?" block 214 and adding one to the acquired coin number data 305 (see FIG. 28). On the other hand, if the "fever mode" is entered (YES in step S57), in step S59, the processor section 111 executes a process of causing a plurality of coin objects 202 to appear from the "?" block 214 so as to be scattered toward the advancing direction side of the player character 201 as shown in FIG. 29. That is, the movement directions of the plurality of coin objects 202 to appear are set to be toward the advancing direction side of the player character 201. The movement speeds of the plurality of coin objects 202 are initially set to be faster than the movement speed of the player character 201, and then set to be slowed down. In addition, these movement speeds of the plurality of coins are set to be random speeds. Thus, the coins are scattered frontward (advancing direction) with respect to the position of the player character 201, whereby collection of the coins can be facilitated even in a forced scrolling game like this game. Thus, the second gimmick block process is ended.

Returning to FIG. 36, next, a process in the case where, as a result of the determination in step S22, the player character 201 is determined to be not in contact with any of the dotted-line block 212, the pause block 213, and the "?" block 214 (NO in step S22), will be described. In this case, in step S23, the processor section 111 determines whether or not a condition for executing the automatic action is satisfied. Specifically, the processor section 111 determines whether or not another object (enemy character or terrain object) is present within a predetermined range from the player character 201 in the advancing direction of the player character 201. In other words, the processor section 111 determines whether or not there is another object having a predetermined positional relationship with the player character 201. Then, the processor section 111 determines whether or not the other object satisfying this condition is a target object (the first-type enemy character, etc.) for which the automatic action is to be performed. If this object is a target object for which the automatic action is to be performed, it is determined that the automatic action execution condition is satisfied. Otherwise, it is determined that the automatic action execution condition is not satisfied.

As a result of the determination, if it is determined that the automatic action execution condition is satisfied (YES in step S23), next, in step S24, the processor section 111 executes a process of selecting or determining the automatic action to be executed. Any process may be used for the selection or the determination. For example, a predetermined automatic action (an identifier thereof, etc.) may be associated in advance with a specific enemy character or terrain object, and the automatic action thus associated may be selected.

Next, in step S25, the processor section 111 sets the advancing direction or the movement speed of the player character 201 in accordance with the selected automatic action. Next, in step S26, the processor section 111 sets the current state data 303 to an "automatic action state". Then, the normal movement process is ended.

On the other hand, as a result of the determination in step S23, if it is determined that the automatic action execution condition is satisfied (NO in step S23), in step S28, the processor section 111 executes a process of moving the player character 201 (and the virtual camera) on the basis of the set movement speed and the set advancing direction. In addition, at this time, a process for detecting collision with an object other than the above objects is also executed. For example, if the player character 201 is in contact with a coin object 202, a process of acquiring the coin object 202 is executed. If the player character 201 is in contact with the second-type enemy character (enemy character that is not a target of the automatic action), a process of adding a damage value to the player character 201, or the like is executed. Thus, the normal movement process is ended.

Returning to FIG. 34, after the normal movement process is ended, the process proceeds to step S13 shown in FIG. 35. The process in step S13 will be described later.

Next, the case where, as a result of the determination in step S3, the current state of the player character 201 is not a "normal movement state" will be described. In this case (NO in step S3), in step S5, the processor section 111 determines whether or not the current state of the player character 201 is an "automatic action state". As a result, if the current state of the player character 201 is an "automatic action state" (YES in step S5), in step S6, an automatic action process is executed. On the other hand, if the current state of the player character 201 is not an "automatic action state" (NO in step S5), the process proceeds to step S7 described later.

Figure 40:
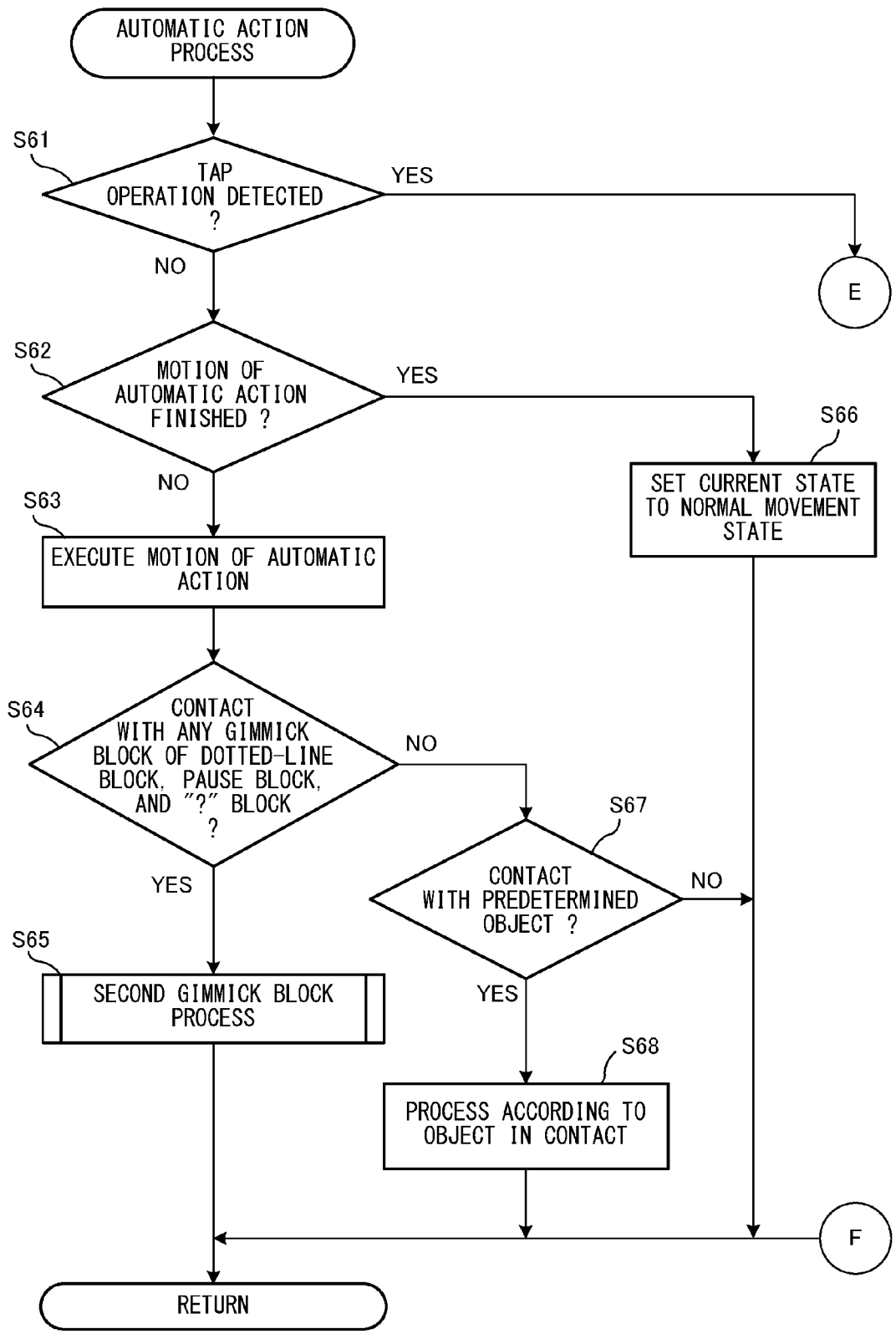
FIG. 40 is a flowchart showing the details of a non-limiting example of an automatic action process.
Figure 41:
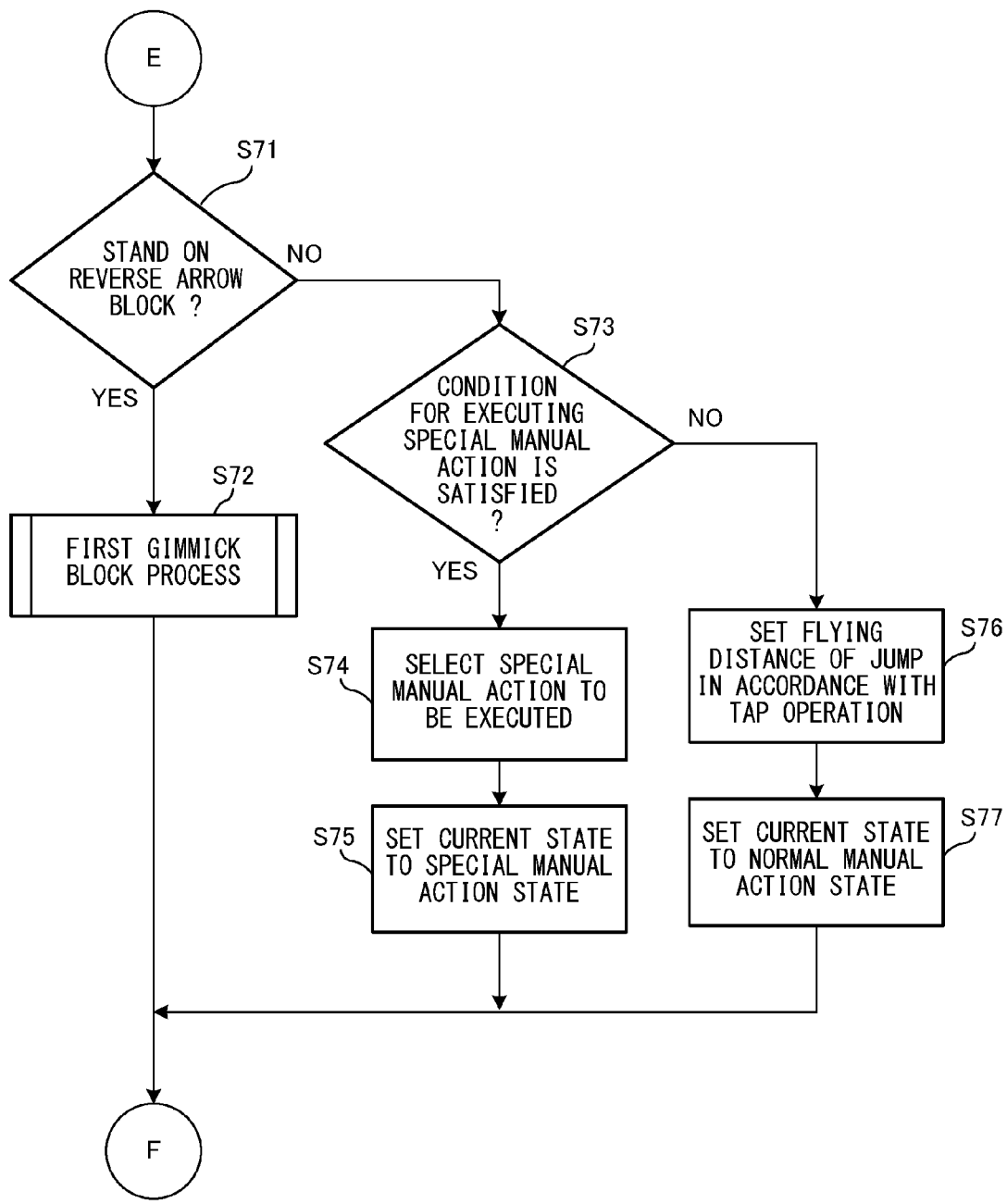
FIG. 41 is a flowchart showing the details of a non-limiting example of the automatic action process.

FIG. 40 and FIG. 41 are flowcharts showing the details of the automatic action process. In FIG. 40, first, in step S61, the processor section 111 determines whether or not a tap operation is performed, by referring to the operation data 302. As a result, if a tap operation is not performed (NO in step S61), next, in step S62, the processor section 111 determines whether or not the motion of the automatic action (that is currently being executed) has been finished. As a result, if the motion of the automatic action has not been finished yet (NO in step S62), next, in step S63, the processor section 111 executes the motion of the automatic action. That is, the processor section 111 moves the player character 201 on the basis of the motion of the automatic action.

Next, in step S64, the processor section 111 determines whether or not the player character 201 is in contact with any of the dotted-line block 212, the pause block 213, and the "?" block 214 described above. As a result, if the player character 201 is in contact with any of the gimmick blocks (YES in step S64), in step S65, the processor section 111 executes the second gimmick block process. It is noted that the second gimmick block process is the same as the process in step S27, and therefore the description thereof is omitted.

On the other hand, as a result of the determination in step S64, if the player character 201 is not in contact with any of the gimmick blocks (NO in step S64), in step S67, the processor section 111 determines whether or not the player character 201 is in contact with a predetermined object other than the above objects. For example, the processor section 111 determines whether or not the player character 201 is in contact with a coin object 202 or a second-type enemy character. As a result of the determination, if the player character 201 is in contact with such an object (YES in step S67), in step S68, a process according to the object in contact, e.g., a process of acquiring a coin, is executed. On the other hand, if the player character 201 is not in contact with such an object (NO in step S67), the process in step S68 is skipped.

On the other hand, as a result of the determination in step S62, if the motion of the automatic action has been finished (YES in step S62), in step S66, the processor section 111 sets the current state data 303 to a "normal movement state". Then, the automatic action process is ended.

On the other hand, as a result of the determination in step S61, if a tap operation is performed (YES in step S61), in step S71 in FIG. 41, the processor section 111 determines whether or not the player character 201 stands above the reverse arrow block 211 (see FIG. 9) as described above. As a result, if the player character 201 stands above the reverse arrow block 211 (YES in step S71), in step S72, the processor section 111 executes the first gimmick block process. It is noted that the first gimmick block process is the same as the process in step S30, and therefore the description thereof is omitted.

On the other hand, as a result of the determination in step S71, if the player character 201 does not stand above the reverse arrow block 211 (NO in step S71), next, in step S73, the processor section 111 determines whether or not a condition for executing the special manual action is satisfied. For example, when a tap operation is performed while a predetermined specific automatic action is being executed, it is determined that the execution condition is satisfied.

As a result of the determination, the condition for executing the special manual action is satisfied (YES in step S73), in step S74, the processor section 111 executes a process of selecting or determining the special manual action to be executed. For example, a specific special manual action is associated in advance with a specific automatic action, and a process of selecting the special manual action thus associated is executed. Therefore, as described above in FIG. 3 to FIG. 7, the content of a special manual action to be executed differs depending on the automatic action that is being executed. That is, different special manual actions are executed depending on the automatic action that is being performed at the time of tapping.

Next, in step S75, the processor section 111 sets the current state data 303 to a "special manual action state".

On the other hand, as a result of the determination in step S73, if the condition for executing the special manual action is not satisfied (NO in step S73), in step S76, the processor section 111 sets the flying distance (a parameter indicating the same) of a jump of the player character 201 in accordance with the touch continuation period of the tap operation. Further, in step S77, the processor section 111 sets, in the current state data 303, information indicating a "normal manual action state". That is, when the condition for executing the special manual action is not satisfied, the operation is treated as an operation for jumping by a manual action. Thus, the automatic action process is ended.

Referring to FIG. 34, next, the case where, as a result of the determination in step S5, the current state of the player character 201 is not an "automatic action state", will be described. In this case (NO in step S5), in step S7, the processor section 111 determines whether or not the current state of the player character 201 is a "normal manual action state". As a result, if the current state of the player character 201 is a "normal manual action state" (YES in step S7), in step S8, the normal manual action process is executed. On the other hand, if the current state of the player character 201 is not a "normal manual action state" (NO in step S7), the process proceeds to step S9 described later.

Figure 42:
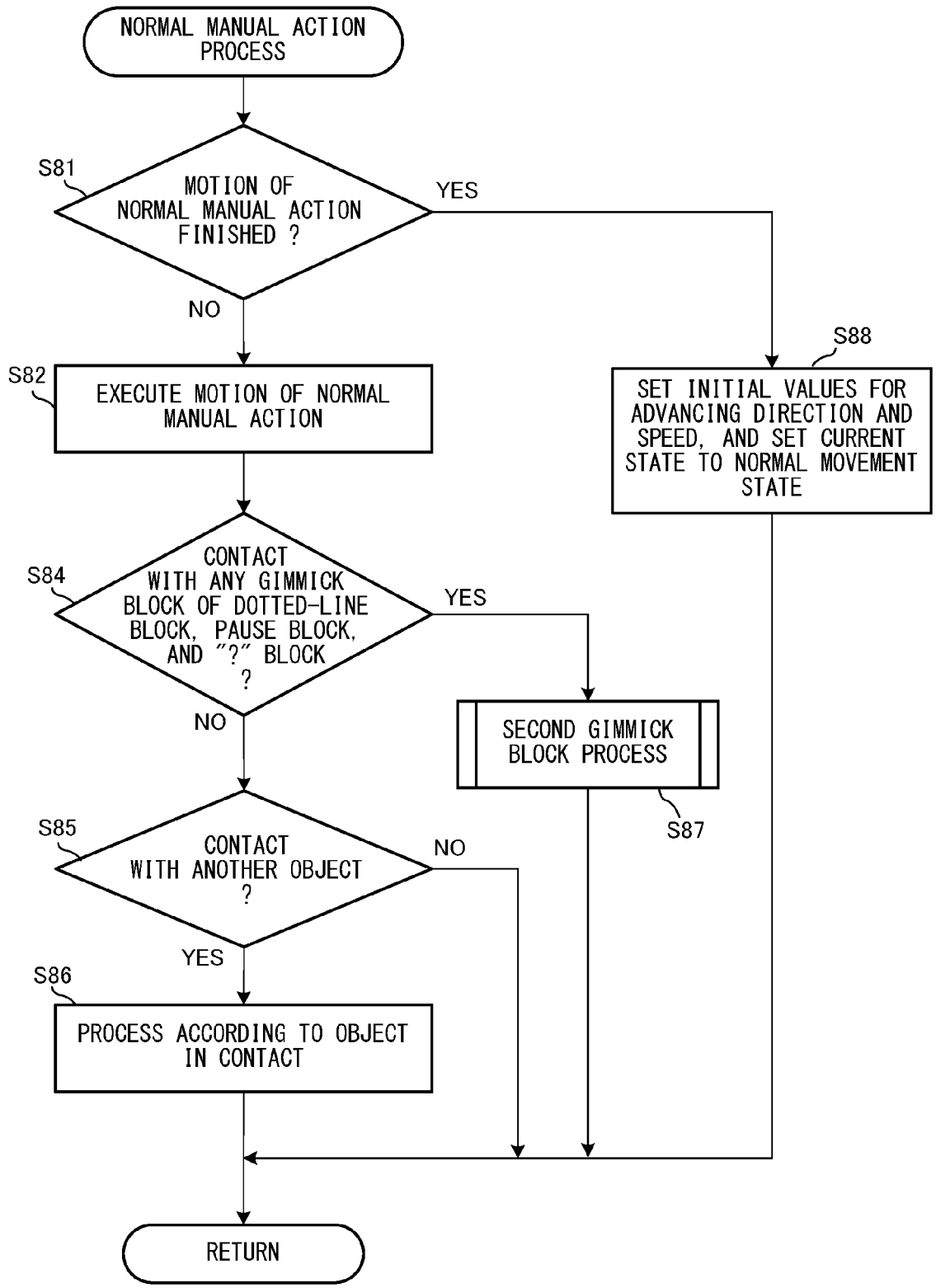
FIG. 42 is a flowchart showing the details of a non-limiting example of a manual action process.

FIG. 42 is a flowchart showing the details of the normal manual action process (in this game, substantially, the normal manual action is a normal jump). In FIG. 42, first, in step S81, the processor section 111 determines whether or not the motion of the normal manual action has been finished. In this game, substantially, the normal manual action is a jump action, and therefore, for example, when the player character 201 lands on the ground part, the motion of the manual action may be determined to have been finished. As a result of the determination, if the motion of the normal manual action has not been finished yet (NO in step S81), in step S82, the motion of the normal manual action is executed. That is, a process of moving the player character 201 on the basis of the motion of the normal manual action is executed.

Next, in step S84, the processor section 111 determines whether or not the player character 201 is in contact with any of the dotted-line block 212, the pause block 213, and the "?" block 214 described above. As a result, if the player character 201 is in contact with any of the gimmick blocks (YES in step S84), in step S85, the processor section 111 executes the second gimmick block process. It is noted that the second gimmick block process is the same as the process in step S27, and therefore the description thereof is omitted.

On the other hand, as a result of the determination in step S84, if the player character 201 is not in contact with any of the gimmick blocks (NO in step S84), in step S85, the processor section 111 determines whether or not the player character is in contact with a predetermined object other than the above objects. As a result of the determination, if the player character 201 is in contact with the predetermined object (YES in step S85), in step S86, the processor section 111 executes a process according to the object in contact, e.g., a process of acquiring a coin if the player character 201 is in contact with a coin object 202. On the other hand, if the player character 201 is not in contact with the predetermined object (NO in step S85), the process in step S86 is skipped.

Next, as a result of the determination in step S81, if the motion of the normal manual action has been finished (YES in step S81), in step S88, the processor section 111 sets the initial values of parameters indicating the advancing direction and the movement speed of the player character 201. Further, the processor section 111 sets the current state data 303 to a "normal movement state". Then, the normal manual action process is ended.

Returning to FIG. 34, next, the case where, as a result of the determination in step S7, the current state of the player character 201 is not a "normal manual action state", will be described. In this case (NO in step S7), in step S9, the processor section 111 determines whether or not the current state of the player character 201 is a "special manual action state". As a result, if the current state of the player character 201 is a "special manual action state" (YES in step S9), in step S10, the special manual action process is executed. On the other hand, if the current state of the player character 201 is not a "special manual action state" (NO in step S9), the process proceeds to step S11 described later.

Figure 43:
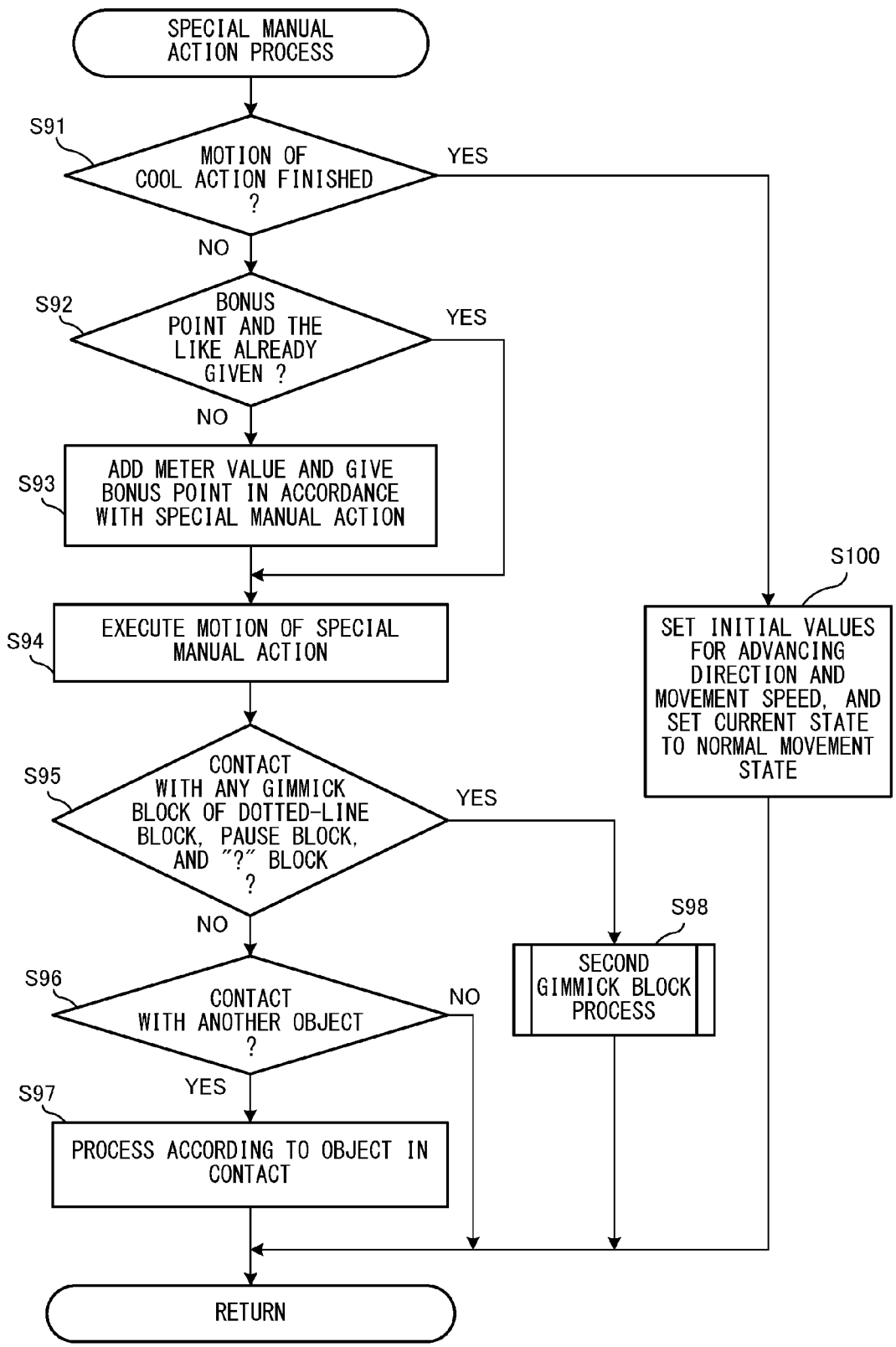
FIG. 43 is a flowchart showing the details of a non-limiting example of a special manual action process.

FIG. 43 is a flowchart showing the details of the special manual action process. In FIG. 43, first, in step S91, the processor section 111 determines whether or not the motion of the special manual action has been finished. As a result of the determination, if the motion of the special manual action has not been finished yet (NO in step S91), in step S92, the processor section 111 determines whether or not addition of a bonus point and a fever meter value for the special manual action that is currently being executed has been already performed. As a result, if the addition has not been performed yet (NO in step S92), in step S93, the processor section 111 executes a process of addition to the fever meter value 304 in accordance with the executed special manual action. Further, the processor section 111 also executes a process of adding the bonus point according to the executed special manual action, to the acquired bonus point data 306. For example, the special manual action performed during the aforementioned leapfrog and the special manual action performed when the player character is clambering a wall, are different in the fever meter value and the bonus points that should be obtained. On the other hand, if a bonus point and the like have been added yet (YES in step S92), the process in step S93 is skipped.

Next, in step S94, the processor section 111 executes the motion of the special manual action. That is, the processor section 111 executes a process of moving the player character 201 on the basis of the motion of the special manual action.

Next, in step S95, the processor section 111 determines whether or not the player character 201 is in contact with any of the dotted-line block 212, the pause block 213, and the "?" block 214 described above. As a result, if the player character 201 is in contact with any of the gimmick blocks (YES in step S95), in step S98, the processor section 111 executes the second gimmick block process. It is noted that the second gimmick block process is the same as the process in step S27, and therefore the description thereof is omitted.

On the other hand, as a result of the determination in step S95, if the player character is not in contact with any of the gimmick blocks (NO in step S95), in step S96, the processor section 111 determines whether or not the player character is in contact with a predetermined object other than the above objects. As a result of the determination, if the player character is in contact with the predetermined object (YES in step S96), in step S97, the processor section 111 executes a process according to the object in contact. On the other hand, if the player character is not in contact with the predetermined object (NO in step S96), the process in step S97 is skipped.

Next, as a result of the determination in step S91, if the motion of the special manual action has been finished (YES in step S91), in step S100, the processor section 111 sets the initial values of parameters indicating the advancing direction and the movement speed of the player character 201. Further, the processor section 111 sets the current state data 303 to a "normal movement state". Then, the special manual action process is ended.

Returning to FIG. 34, next, the case where, as a result of the determination in step S9, the current state of the player character 201 is a "special manual action state", will be described. In this case (NO in step S9), in step S11, the processor section 111 determines whether or not the current state of the player character 201 is a "temporary stopped state". As a result, if the current state of the player character 201 is a "temporary stopped state" (YES in step S11), in step S12, a temporary stop process is executed. On the other hand, if the current state of the player character 201 is not a "temporary stopped state" (NO in step S11), the process proceeds to step S13 described later.

Figure 44:
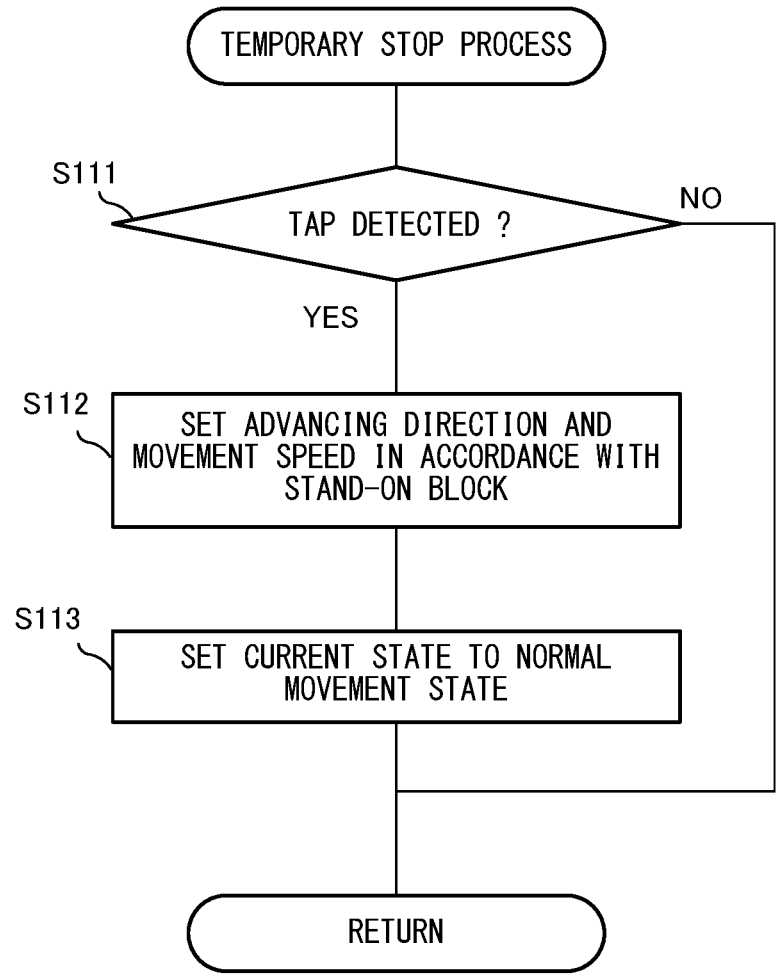
FIG. 44 is a flowchart showing the details of a non-limiting example of a temporary stop process.

FIG. 44 is a flowchart showing the details of the temporary stop process. In FIG. 44, first, in step S111, whether or not a tap operation is performed is determined by referring to the operation data 302. As a result, if a tap operation is not performed (NO in step S111), the temporary stop process is ended (that is, nothing is performed in particular and the player character 201 is kept being stopped).

On the other hand, if a tap operation is performed (YES in step S111), in step S112, the processor section 111 sets the parameters of the advancing direction and the movement speed in accordance with the pause block above which the player character 201 stands. As described above, in this game, two types of the pause blocks are used (see FIG. 19 to FIG. 24). Therefore, the advancing direction and the movement speed are set so that one of a motion of advancing straight in the rightward direction and a motion of jumping is to be performed in accordance with the pause block above which the player character 201 is stands. In addition, in the case of performing a motion of advancing straight in the rightward direction, the movement speed is set to be returned to the movement speed before the stoppage.

Next, in step S113, the processor section 111 sets the current state data 303 to the normal movement state. Then, the temporary stop process is ended.

Next, a process from step S13 in FIG. 35 will be described. First, in step S13, the processor section 111 executes a drawing process. That is, the processor section 111 executes a process of drawing an image obtained by a virtual camera imaging a virtual game space in which the processing described above is reflected.

Next, in step S14, the processor section 111 determines whether or not the game course is cleared. That is, the processor section 111 determines whether or not the goal point is reached. It is noted that, in the case where a time limit is set, the course is regarded as cleared at the time when the time limit has passed, even if the goal has not been reached yet. As a result of the determination, if the course is not cleared (NO in step S14), the process returns to step S2 to repeat the process. If the course is cleared (YES in step S14), in step S15, the processor section 111 executes a result screen process. Specifically, the processor section 111 executes a process of displaying a predetermined result screen to present the number of acquired coins, the number of acquired bonus points, a final score, and the like, to the player.

Thus, the detailed description of the game process according to the exemplary embodiment has been finished.

As described above, in the exemplary embodiment, it is possible to improve the operability and provide variations in play content, just by a simple operation of only a tap operation. For example, by adopting the automatic actions and the special manual actions as described above, it is possible to increase options for the player, with a simple operation system. For example, owing to provision of the automatic actions, the player character may be intentionally brought into contact with an enemy character, and thus variations of play content can be increased. In addition, by, for example, giving bonus points, the special manual actions themselves are evaluated in an easily understandable way to the player, and thus a new motivation for game play can be given to the player. In addition, owing to the simple operation, beginners at games can enjoy the game, and at the same time, owing to elements such as the automatic actions, the special manual actions, and the various gimmick blocks, thorough-play elements can also be provided to experts.

In addition, providing the reverse arrow blocks as described above in a forced scrolling game as in this game brings about change in the direction of the automatic scrolling, thereby providing unexpectedness and providing variations in course advancement route. Thus, amusement of the game can be further enhanced.

In addition, providing the pause block as described above in a game in which a player character automatically moves as in this game can provide an occasion that allows selection of a movement timing in accordance with a player's operation. That is, even during an automatic movement, an occasion that allows a player's intension to be reflected can be provided, whereby amusement of the game can be enhanced.

In addition, providing the dotted-line block as described above in a game of automatic scrolling type (automatic movement type) as in this game makes it possible to guide the motion of the player character 201 (player's operation) to a certain extent. That is, it is possible to cause the player to predict that coin objects 202 will appear in the direction indicated by the dotted-line block (or other than coins, there will be something), thereby providing an effect of guiding a player's operation in the arrow direction. Thus, the player is notified in advance of variations in advancement route, whereby amusement of the game can be further enhanced.

As an example of the motions of the automatic actions described above, a motion of leapfrogging to avoid an enemy character has been shown. In another exemplary embodiment, the automatic action and the normal manual action may be set to perform the same action. For example, as an automatic action for avoiding an enemy character, the same jump action as the normal manual action may be performed.

Regarding the fever meter 203, in the above example, the meter is filled when the special manual action is performed. In another exemplary embodiment, the fever meter may be filled also when the automatic action is performed. In this case, the amount by which the meter is filled by the special manual action may be set to be greater than the amount by which the meter is filled by the automatic action. Thus, the fever meter is filled without the player particularly performing any operation. Therefore, the degree of difficulty of the game can be adjusted and superiority of performing the special manual action can be ensured.

In the above description, the example in which the fever mode is executed when the points in the fever meter reach a predetermined value (the meter becomes full), has been shown. Besides, another process using the points accumulated by the special manual actions may be allowed to be executed. For example, a competitive game process may be executed in which win-lose determination with another player is performed using the points accumulated by the special manual action. More specifically, win-lose determination may be performed by comparison of the numbers of points. Alternatively, win-lose determination may be performed on the basis of both the number of acquired coins and the acquired bonus points (for example, the number of acquired coins may be multiplied by a correction coefficient based on the bonus points, to perform large-small determination of the resultant number). This competitive game process may be a synchronous competitive type (real-time competition) or may be an asynchronous competitive type. Regarding transmission and reception of data in the competitive game process, the competitive game process may be of a type in which the communication is performed via a predetermined server, or of a type in which the communication is directly performed between smart devices not via a server. A purchase process (shopping process) may be performed which, for example, enables purchase of items that can be used in the game process as described above by consuming the points.

Regarding the giving of a bonus point or the like for the special manual action, in the above exemplary embodiment, a bonus point or the like is given at the time when the special manual action is performed. Other than this, in another exemplary embodiment, a bonus point or the like may be given for a result of a series of actions. For example, it is assumed that a plurality of coin objects 202 are arranged at such a position that it is normally difficult to acquire the coin objects, in the game course. Then, if the plurality of coin objects are all acquired within a predetermined period, the series of actions relevant to the acquisition of the coins may be treated as the special manual action afterward and a bonus point or the like may be given accordingly. Besides, for example, if such actions as to stomp on three or more enemy characters continuously is performed, this series of actions may be treated as the special manual action afterward and a bonus point or the like may be given accordingly.

In the above example, the determination as to the condition for executing the special manual action is performed on the basis of a tap operation during the automatic action. Other than this, in another exemplary embodiment, determination as to the condition for executing the special manual action may be performed on the basis of a tap operation performed during a motion of the normal manual action. That is, in the case where the player character 201 is caused to jump as the normal manual action, if a tap operation is performed under a situation in which the jump is being performed and a predetermined condition is satisfied, the special manual action may be executed.

Regarding the reverse arrow blocks, in the above example, the player character 201 is temporarily moved in the opposite direction by a tap operation being performed when the player character 201 stands on the reverse arrow block. In another exemplary embodiment, the player character 201 may be caused to jump in the opposite direction as described above at the time when the player character 201 comes into contact with the reverse arrow block. In this case, the player cannot further proceed unless the player avoids the reverse arrow block by a jump by the manual action.

Regarding the pause block, in the above example, movement of the player character 201 is temporarily stopped when the player character 201 stands on the pause block. In another exemplary embodiment, other than temporary stoppage, a process of reducing or increasing the movement speed of the player character 201 may be performed.

Figure 45:
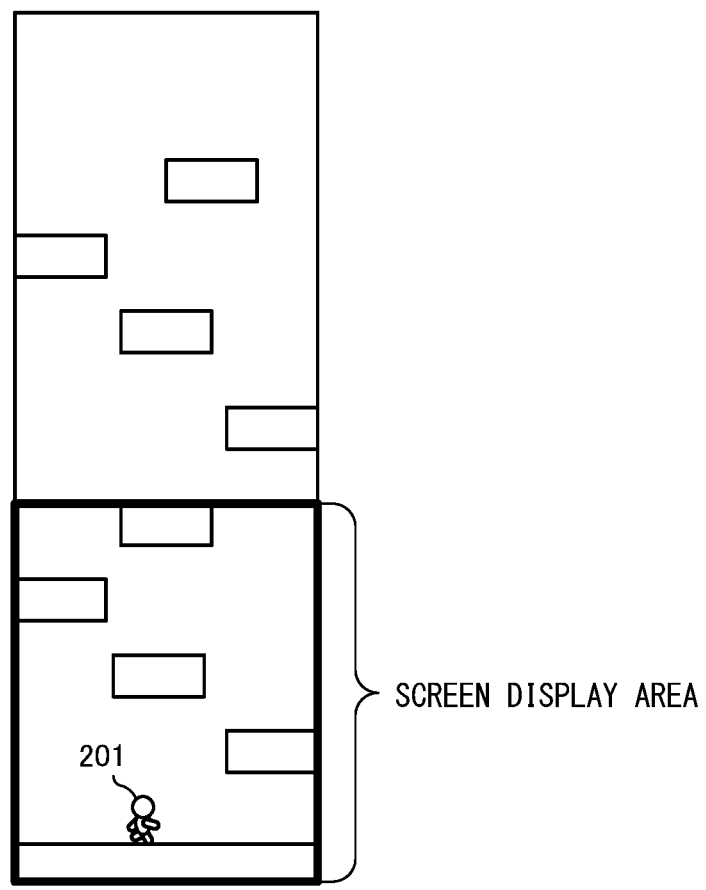
FIG. 45 is another non-limiting example of a game course configuration according to the exemplary embodiment.
Figure 46:
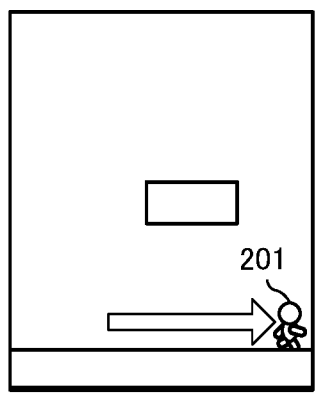
FIG. 46 is another non-limiting example of a game screen according to the exemplary embodiment.
Figure 47:
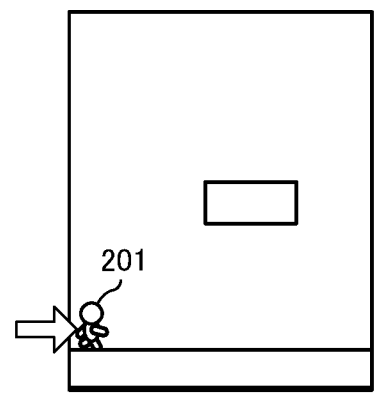
FIG. 47 is another non-limiting example of a game screen according to the exemplary embodiment.
Figure 48:
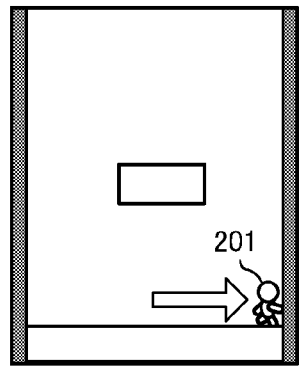
FIG. 48 is another non-limiting example of a game screen according to the exemplary embodiment.
Figure 49:
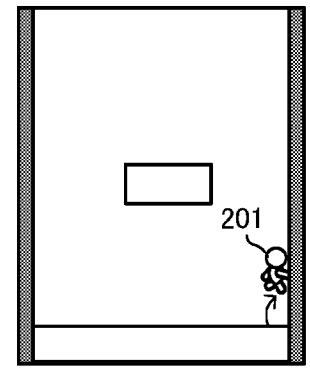
FIG. 49 is another non-limiting example of a game screen according to the exemplary embodiment.
Figure 50:
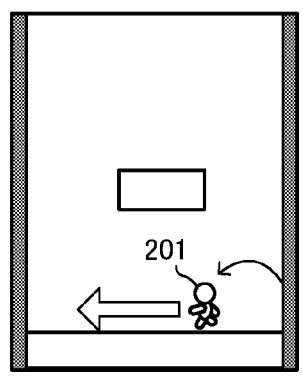
FIG. 50 is another non-limiting example of a game screen according to the exemplary embodiment.
Figure 51:
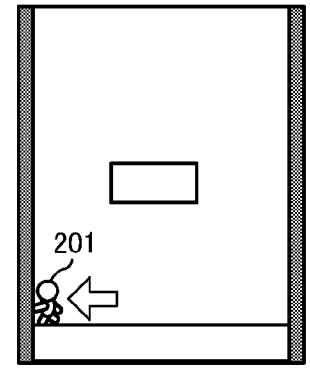
FIG. 51 is another non-limiting example of a game screen according to the exemplary embodiment.
Figure 52:
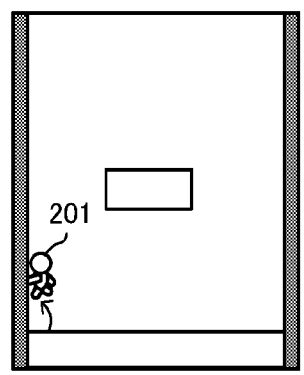
FIG. 52 is another non-limiting example of a game screen according to the exemplary embodiment.
Figure 53:
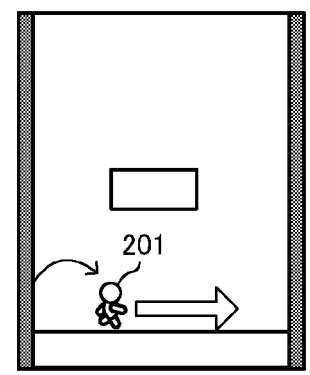
FIG. 53 is another non-limiting example of a game screen according to the exemplary embodiment.

In the above exemplary embodiment, the case where the automatic movement direction of the player character 201 and the scrolling direction coincide with each other has been described as an example. These two directions do not necessarily need to coincide with each other. In another exemplary embodiment, they may be different directions. For example, while the automatic movement direction of the player character 201 is the screen horizontal direction, the game course may be scrolled in the vertical direction without being scrolled in the horizontal direction. That is, the game course is assumed to have a vertically elongated configuration (see FIG. 45). In this case, the player character 201 is to ascend upward from below while jumping. In addition, regarding movement in the horizontal direction of the player character 201 in this case, for example, movement control may be performed so that the player character 201 appears from the left end of the screen when reaching the right end of the screen (see FIG. 46 and FIG. 47). That is, the right end and the left end of the screen may be linked so as to loop. Alternatively, as shown in FIG. 48, walls may be formed at the right and left ends of the screen, and the automatic movement direction of the player character 201 may be controlled so as to switch to a reverse direction by performing the "wall-kick jump" as described above. That is, the following control may be performed. When the automatic movement direction is the rightward direction, if the player character 201 reaches the right end of the screen and performs a wall-kick jump (see FIG. 49), the automatic movement direction changes to the leftward direction (see FIG. 50), and thereafter, if the player character 201 reaches the left end of the screen (see FIG. 51) and performs a wall-kick jump (see FIG. 52), the automatic movement direction changes to the rightward direction (see FIG. 53).

In the above exemplary embodiment, the case where a series of processes in the game process as described above are executed in a single device (smart device), has been described. However, in another exemplary embodiment, the series of processes may be executed in an information process system composed of a plurality of information processing apparatuses. For example, in an information process system including a terminal apparatus and a server apparatus capable of communicating with the terminal apparatus via a network, some of the series of processes may be executed by the server apparatus. In an information process system including a terminal apparatus and a server apparatus capable of communicating with the terminal apparatus via a network, a major process of the series of processes may be executed by the server apparatus, and some of the series of processes may be executed by the terminal apparatus. In such an information process system, a system on the server side may be composed of a plurality of information processing apparatuses, and processes that should be executed on the server side may be executed in a shared manner by the plurality of information processing apparatuses.

The computer-readable non-transitory storage medium having stored therein the game program, and the like, according to the exemplary embodiments can provide a game process that realizes variations in play content with simple operability, and is suitable for application to a portable smart device, various types of game apparatuses, and the like.

What is claimed is:

1. A computer-readable non-transitory storage medium having stored therein a game program that causes a computer of an information processing apparatus configured to receive touch input to execute a game in which a game screen is scrolled in a predetermined direction, the game program when executed causing the computer to at least:
   move a player character in the predetermined direction on the game screen even though a movement command is not input by a player;
   determine whether the player character has come within a predetermined distance of an obstacle object that otherwise would hinder movement of the player character;
   cause the player character to execute a first action in response to touch input provided by a player when the player character is being moved, provided that the player character has not come within the predetermined distance of the obstacle object;
   responsive to a determination that the player character has come within the predetermined distance of the obstacle object, cause the player character to automatically take a second action to pass the obstacle object, provided that touch input is not received from the player while the player character is taking the second action; and
   responsive to a determination that the player character has come within the predetermined distance of the obstacle object, interrupt the second action and cause the player character to take a third action and add a first point provided that touch input is received from the player at a predetermined timing,
   wherein the third action is different from the first and second actions, and
   wherein the first, second, and third actions each modify how the player character moves.

2. The computer-readable non-transitory storage medium having stored therein the game program according to claim 1, the game program when executed further causing the computer to at least add a second point responsive to a determination that the player character has come within the predetermined distance of the obstacle object and provided that touch input is not received from the player while the player character is taking the second action.

3. The computer-readable non-transitory storage medium having stored therein the game program according to claim 2, wherein the first and second points are different from one another.

4. The computer-readable non-transitory storage medium having stored therein the game program according to claim 2, wherein whether the second action is caused is conditioned on the player character and the obstacle object having a predetermined positional relationship to one another.

5. The computer-readable non-transitory storage medium having stored therein the game program according to claim 4, wherein the predetermined positional relationship corresponds to the player character coming into contact with the obstacle object.

6. The computer-readable non-transitory storage medium having stored therein the game program according to claim 4, wherein whether the second action is caused is conditioned on the player character and the obstacle object having predetermined positional relationship to one another when contacting one another.

7. The computer-readable non-transitory storage medium having stored therein the game program according to claim 4, wherein the obstacle object is one of a first-type obstacle object and a second-type obstacle object, and whether the second action is caused is further conditioned on the obstacle object being the first-type obstacle object.

8. The computer-readable non-transitory storage medium having stored therein the game program according to claim 4, wherein execution of the second action causes the player character to pass the obstacle object by avoiding the obstacle object.

9. The computer-readable non-transitory storage medium having stored therein the game program according to claim 2, the game program when executed further causing the computer to at least cause the third action to be executed provided that touch input is received from the player while the player character is executing the second action.

10. The computer-readable non-transitory storage medium having stored therein the game program according to claim 1, the game program when executed further causing the computer to at least add a third point in response to a predetermined condition being satisfied as a result of the first action being executed.

11. The computer-readable non-transitory storage medium having stored therein the game program according to claim 1, the game program when executed further causing the computer to at least cause the third action to be executed provided that touch input is received from the player while the player character is executing an action different from the first action.

12. The computer-readable non-transitory storage medium having stored therein the game program according to claim 1, the game program when executed further causing the computer to at least cause the third action to be executed provided that touch input is received from the player when the player character and another object have a predetermined positional relationship.

13. The computer-readable non-transitory storage medium having stored therein the game program according to claim 1, wherein:
the information processing apparatus further comprises a touch panel that is integrated with a screen and configured to receive touch input, and
touch input is receivable responsive to the player touching any position within a display area that excludes some area on the screen.

14. The computer-readable non-transitory storage medium having stored therein the game program according to claim 1, wherein
the information processing apparatus further comprises a touch panel that is integrated with a screen and configured to receive touch input,
the game screen includes at least two areas, wherein a first area displays a virtual game space imaged by a virtual camera, and a second area that does not display the virtual game space, and
the touch input is receivable responsive to the player touching any position within the first area.

15. The computer-readable non-transitory storage medium having stored therein the game program according to claim 1, the game program when executed further causing the computer to at least scroll the game screen so that a display area displaying a virtual game space imaged by a virtual camera is scrolled in the predetermined direction so as to follow movement of the player character.

16. The computer-readable non-transitory storage medium having stored therein the game program according to claim 1, wherein the first point is not added in response to execution of the first action alone.

17. The computer-readable non-transitory storage medium having stored therein the game program according to claim 1, wherein whether the third action is caused depends on whether the touch input is determined to be a touch-on event.

18. The computer-readable non-transitory storage medium having stored therein the game program according to claim 1, wherein execution of the third action is caused responsive to one of a plurality of different conditions being satisfied.

19. The computer-readable non-transitory storage medium having stored therein the game program according to claim 18, wherein the third action is performable as one of a plurality of different actions depending on which one of the different conditions is met.

20. The computer-readable non-transitory storage medium having stored therein the game program according to claim 19, wherein an amount associated with the first point is set depending on which one of the plurality of different actions is to be performed.

21. The computer-readable non-transitory storage medium having stored therein the game program according to claim 1, the game program when executed further causing the computer to at least add a third point different from the first point.

22. The computer-readable non-transitory storage medium having stored therein the game program according to claim 21, wherein the third point is added in response to the player character coming into contact with an item object placed in a virtual game space.

23. The computer-readable non-transitory storage medium having stored therein the game program according to claim 1, the game program when executed further causing the computer to at least: responsive to a determination that the player character has come within the predetermined distance of the obstacle object after the first action has been initiated, cause the player character to take the third action, and add the first point, provided that touch input is received from the player at the predetermined timing.

24. The computer-readable non-transitory storage medium having stored therein the game program according to claim 1, wherein the third action corresponds to a first jumping action, and the second action and/or the third action correspond(s) to a second jumping action different from the first jumping action.

25. The computer-readable non-transitory storage medium having stored therein the game program according to claim 1, wherein the obstacle object is a geographical object.

26. The computer-readable non-transitory storage medium having stored therein the game program according to claim 1, wherein the obstacle object is an enemy object.

27. The computer-readable non-transitory storage medium having stored therein the game program according to claim 1, wherein the obstacle object is one of a plurality of different types of enemy characters.

28. A game processing method for causing a computer of an information processing apparatus configured to receive touch input to control a game in which a game screen is scrolled in a predetermined direction, the game processing method comprising:
moving a player character in the predetermined direction on the game screen even though a movement command is not input by a player;
determining whether the player character has come within a predetermined distance of an obstacle object that otherwise would hinder movement of the player character;
causing the player character to execute a first action in response to touch input provided by a player when the player character is being moved, provided that the player character has not come within the predetermined distance of the obstacle object;
responsive to a determination that the player character has come within the predetermined distance of the obstacle object, causing the player character to automatically take a second action to pass the obstacle object, provided that touch input is not received from the player while the player character is taking the second action; and
responsive to a determination that the player character has come within the predetermined distance of the obstacle object, interrupting the second action and causing the player character to take a third action and adding a first point provided that touch input is received from the player at a predetermined timing, wherein the third action is different from the first and second actions, and wherein the first, second, and third actions each modify how the player character moves.

29. A game system, comprising:

a display;

a touch panel configured to receive touch input; and at least one processor configured to execute a game in which a game screen is scrolled in a predetermined direction, and in executing the game:

move a player character in the predetermined direction on the game screen even though a movement command is not input by a player;

determine whether the player character has come within a predetermined distance of an obstacle object that otherwise would hinder movement of the player character;

cause the player character to execute a first action in response to touch input provided by a player when the player character is being moved, provided that the player character has not come within the predetermined distance of the obstacle object;

responsive to a determination that the player character has come within the predetermined distance of the obstacle object, cause the player character to automatically take a second action to pass the obstacle object, provided that touch input is not received from the player while the player character is taking the second action; and responsive to a determination that the player character has come within the predetermined distance of the obstacle object, interrupt the second action and cause the player character to take a third action and add a first point provided that touch input is received from the player at a predetermined timing, wherein the third action is different from the first and second actions, and wherein the first, second, and third actions each modify how the player character moves.

30. A game apparatus configured to execute a game in which a game screen is scrolled in a predetermined direction, the game apparatus comprising at least one processor configured to at least:

move a player character in the predetermined direction on the game screen even though a movement command is not input by a player;

determine whether the player character has come within a predetermined distance of an obstacle object that otherwise would hinder movement of the player character;

cause the player character to execute a first action in response to touch input provided by a player when the player character is being moved, provided that the player character has not come within the predetermined distance of the obstacle object;

responsive to a determination that the player character has come within the predetermined distance of the obstacle object, cause the player character to automatically take a second action to pass the obstacle object, provided that touch input is not received from the player while the player character is taking the second action; and responsive to a determination that the player character has come within the predetermined distance of the obstacle object, interrupt the second action and cause the player character to take a third action and add a first point provided that touch input is received from the player at a predetermined timing, wherein the third action is different from the first and second actions, and wherein the first, second, and third actions each modify how the player character moves.

* * * * *